(12) United States Patent
Sugimoto

(10) Patent No.: US 10,295,040 B2
(45) Date of Patent: May 21, 2019

(54) BICYCLE SPROCKET AND BICYCLE CRANK ASSEMBLY

(71) Applicant: SHIMANO INC., Sakai (JP)

(72) Inventor: Akinobu Sugimoto, Sakai (JP)

(73) Assignee: SHIMANO INC., Sakai (JP)

( * ) Notice: Subject to any disclaimer, the term of this patent is extended or adjusted under 35 U.S.C. 154(b) by 212 days.

(21) Appl. No.: 15/299,410

(22) Filed: Oct. 20, 2016

(65) Prior Publication Data

US 2018/0112764 A1 Apr. 26, 2018

(51) Int. Cl.
*F16H 55/30* (2006.01)
*B62M 9/00* (2006.01)
*B62M 1/36* (2013.01)
*B62M 9/10* (2006.01)

(52) U.S. Cl.
CPC ............... *F16H 55/30* (2013.01); *B62M 1/36* (2013.01); *B62M 9/00* (2013.01); *B62M 9/10* (2013.01); *B62M 2009/007* (2013.01)

(58) Field of Classification Search
CPC .......... F16H 55/30; B62M 1/36; B62M 9/00; B62M 2009/007
See application file for complete search history.

(56) References Cited

U.S. PATENT DOCUMENTS

| | | | | |
|---|---|---|---|---|
| 3,956,943 A * | 5/1976 | Yamasaki | ................ | B62M 9/10 474/148 |
| 4,330,286 A | 5/1982 | Nagano | | |
| 2008/0190462 A1 * | 8/2008 | Guldenfels | ............... | B08B 3/02 134/44 |
| 2008/0293528 A1 * | 11/2008 | Paull | ........................ | B62J 13/00 474/144 |
| 2014/0338494 A1 * | 11/2014 | Sugimoto | ................ | B62M 1/36 74/594.2 |
| 2015/0094179 A1 * | 4/2015 | Iwai | ........................ | F16H 55/30 474/152 |
| 2015/0239528 A1 * | 8/2015 | Barefoot | .................. | B62M 9/00 474/152 |
| 2016/0053882 A1 * | 2/2016 | Watarai | ................... | F16H 55/30 474/152 |
| 2016/0347409 A1 * | 12/2016 | Watarai | ..................... | B62M 9/02 |
| 2017/0183060 A1 * | 6/2017 | Braedt | ..................... | B62M 9/10 |
| 2017/0247081 A1 * | 8/2017 | Sugimoto | ............... | F16H 55/30 |
| 2017/0247193 A1 * | 8/2017 | Elhassouni | ............ | B65G 23/06 |

FOREIGN PATENT DOCUMENTS

DE 2816137 10/1979

* cited by examiner

*Primary Examiner* — Michael R Mansen
*Assistant Examiner* — Robert T Reese
(74) *Attorney, Agent, or Firm* — Mori & Ward, LLP

(57) ABSTRACT

A bicycle sprocket comprises a sprocket body, a plurality of sprocket teeth, and at least one chain-supporting portion. The plurality of sprocket teeth includes at least one first tooth and at least one second tooth. The at least one chain-supporting portion is arranged on the sprocket body to face the bicycle chain in an axial direction parallel to a rotational center axis of the bicycle sprocket without being received within an outer link space and an inner link space in a state where the plurality of sprocket teeth engages with a bicycle chain. The at least one chain-supporting portion is spaced apart from at least one of at least one first tooth and the at least one second tooth in the axial direction.

26 Claims, 15 Drawing Sheets

BICYCLE SPROCKET AND BICYCLE CRANK ASSEMBLY

BACKGROUND OF THE INVENTION

Field of the Invention

The present invention relates to a bicycle sprocket and a bicycle crank assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle sprocket comprises a sprocket body, a plurality of sprocket teeth, and at least one chain-supporting portion. The plurality of sprocket teeth is circumferentially arranged on an outer periphery of the sprocket body. The plurality of sprocket teeth includes at least one first tooth and at least one second tooth. The at least one first tooth is arranged on the outer periphery to be received within an outer link space defined between a pair of outer link plates of a bicycle chain. The at least one second tooth is arranged on the outer periphery to be received within an inner link space defined between a pair of inner link plates of the bicycle chain. The at least one chain-supporting portion is arranged on the sprocket body to face the bicycle chain in an axial direction parallel to a rotational center axis of the bicycle sprocket without being received within the outer link space and the inner link space in a state where the plurality of sprocket teeth engages with the bicycle chain. The at least one chain-supporting portion is spaced apart from at least one of the at least one first tooth and the at least one second tooth in the axial direction.

With the bicycle sprocket according to the first aspect, the bicycle chain can be engaged with the plurality of sprocket teeth in an inclination state where the bicycle chain is inclined relative to the bicycle sprocket when viewed from a radial direction perpendicular to the rotational center axis. However, the at least one chain-supporting portion can improve chain-holding performance of the bicycle sprocket in the inclination state of the bicycle chain since the at least one chain-supporting portion is arranged on the sprocket body to face the bicycle chain in the axial direction without being received within the outer link space and the inner link space.

In accordance with a second aspect of the present invention, the bicycle sprocket according to the first aspect is configured so that the at least one chain-supporting portion is arranged on the sprocket body to face the at least one of the at least one first tooth and the at least one second tooth in the axial direction.

With the bicycle sprocket according to the second aspect, the at least one chain-supporting portion can further improve chain-holding performance of the bicycle sprocket in the inclination state of the bicycle chain.

In accordance with a third aspect of the present invention, the bicycle sprocket according to the first or second aspect is configured so that the at least one first tooth includes a first axial center plane defined at a center of the at least one first tooth in the axial direction. The at least one second tooth includes a second axial center plane defined at a center of the at least one second tooth in the axial direction. The first axial center plane and the second axial center plane are offset from each other in the axial direction.

With the bicycle sprocket according to the third aspect, the bicycle chain can be engaged with the plurality of sprocket teeth in an inward inclination state where the bicycle chain is inclined toward a bicycle frame relative to the bicycle sprocket when viewed from the radial direction. Furthermore, the bicycle chain can be engaged with the plurality of sprocket teeth in an outward inclination state where the bicycle chain is inclined toward an opposite side of the bicycle frame relative to the bicycle sprocket when viewed from the radial direction. However, the at least one chain-supporting portion, the at least one first tooth, and the at least one second tooth can further improve chain-holding performance of the bicycle sprocket in the inward inclination state and the outward inclination state of the bicycle chain since the first axial center plane and the second axial center plane are offset from each other in the axial direction.

In accordance with a fourth aspect of the present invention, the bicycle sprocket according to the third aspect is configured so that the at least one first tooth and the at least one second tooth are alternatingly arranged on the outer periphery of the sprocket body in a circumferential direction with respect to the rotational center axis.

With the bicycle sprocket according to the fourth aspect, the at least one chain-supporting portion, the at least one first tooth, and the at least one second tooth can further improve chain-holding performance of the bicycle sprocket in the inward inclination state and the outward inclination state of the bicycle chain.

In accordance with a fifth aspect of the present invention, the bicycle sprocket according to any one of the first to fourth aspects is configured so that the at least one chain-supporting portion is arranged on the sprocket body to support the bicycle chain so that the bicycle chain is partly positioned between the at least one chain-supporting portion and the at least one of the at least one first tooth and the at least one second tooth in the axial direction.

With the bicycle sprocket according to the fifth aspect, the at least one chain-supporting portion can further improve chain-holding performance of the bicycle sprocket in the inclination state of the bicycle chain.

In accordance with a sixth aspect of the present invention, the bicycle sprocket according to any one of the first to fifth aspects is configured so that the sprocket body includes a first axial surface, a second axial surface, and a reference axial center plane. The second axial surface is opposite to the first axial surface in the axial direction. The reference axial center plane is defined at a center between the first axial surface and the second axial surface in the axial direction. The first axial center plane is offset from the reference axial center plane toward the first axial surface in the axial direction.

With the bicycle sprocket according to the sixth aspect, the at least one chain-supporting portion, the at least one first tooth, and the at least one second tooth can further improve chain-holding performance of the bicycle sprocket in the inward inclination state and the outward inclination state of the bicycle chain.

In accordance with a seventh aspect of the present invention, the bicycle sprocket according to the sixth aspect is configured so that the first axial surface is disposed closer to the at least one first tooth than the second axial surface in the axial direction.

With the bicycle sprocket according to the seventh aspect, the at least one chain-supporting portion, the at least one first tooth, and the at least one second tooth can further improve chain-holding performance of the bicycle sprocket in the inward inclination state and the outward inclination state of the bicycle chain.

In accordance with an eighth aspect of the present invention, the bicycle sprocket according to the sixth or seventh aspect is configured so that the reference axial center plane defines a first axial area and a second axial area opposite to the first axial area relative to the reference axial center plane in the axial direction. The first axial surface and the first axial center plane are arranged in the first axial area. The second axial surface is arranged in the second axial area. The at least one chain-supporting portion is arranged in the first axial area and faces the at least one second tooth in the axial direction.

With the bicycle sprocket according to the eighth aspect, it is possible to easily arrange the at least one chain-supporting portion with improving chain-holding performance of the bicycle sprocket in the inward inclination state and the outward inclination state of the bicycle chain.

In accordance with a ninth aspect of the present invention, the bicycle sprocket according to any one of the first to eighth aspects is configured so that the at least one first tooth has a first tooth-tip center plane and a first tooth-bottom center plane. The first tooth-tip center plane is offset from the first tooth-bottom center plane toward the second axial surface in the axial direction.

With the bicycle sprocket according to the ninth aspect, the at least one chain-supporting portion can further improve chain-holding performance of the bicycle sprocket in an inclination state where the bicycle chain is inclined toward the second axial area relative to the bicycle sprocket.

In accordance with a tenth aspect of the present invention, the bicycle sprocket according to any one of the first to eighth aspects is configured so that the at least one second tooth has a second tooth-tip center plane and a second tooth-bottom center plane. The second tooth-tip center plane is offset from the second tooth-bottom center plane toward the second axial surface in the axial direction.

With the bicycle sprocket according to the tenth aspect, the at least one chain-supporting portion can further improve chain-holding performance of the bicycle sprocket in an inclination state where the bicycle chain is inclined toward the second axial area relative to the bicycle sprocket.

In accordance with an eleventh aspect of the present invention, the bicycle sprocket according to any one of the first to eighth aspects is configured so that the at least one first tooth has a first tooth-tip center plane and a first tooth-bottom center plane. The first tooth-tip center plane is offset from first tooth-bottom center plane toward the second axial surface in the axial direction. The at least one second tooth has a second tooth-tip center plane and a second tooth-bottom center plane. The second tooth-tip center plane is offset from the second tooth-bottom center plane toward the second axial surface in the axial direction.

With the bicycle sprocket according to the eleventh aspect, the at least one chain-supporting portion can further improve chain-holding performance of the bicycle sprocket in an inclination state where the bicycle chain is inclined toward the second axial area relative to the bicycle sprocket.

In accordance with a twelfth aspect of the present invention, the bicycle sprocket according to the sixth or seventh aspect is configured so that the reference axial center plane defines a first axial area and a second axial area opposite to the first axial area relative to the reference axial center plane in the axial direction. The first axial surface and the first axial center plane are arranged in the first axial area. The second axial surface is arranged in the second axial area. The at least one chain-supporting portion is arranged in the first axial area and faces the at least one first tooth in the axial direction.

With the bicycle sprocket according to the twelfth aspect, it is possible to further improve chain-holding performance of the bicycle sprocket for outer link plates of the bicycle chain with improving chain-holding performance of the bicycle sprocket in the inward inclination state and the outward inclination state of the bicycle chain.

In accordance with a thirteenth aspect of the present invention, the bicycle sprocket according to any one of the first to seventh, eleventh, and twelfth aspects is configured so that the at least one first tooth has a first tooth-tip center plane and a first tooth-bottom center plane. The first tooth-tip center plane is offset from the first tooth-bottom center plane toward the second axial surface in the axial direction.

With the bicycle sprocket according to the thirteenth aspect, the at least one chain-supporting portion can further improve chain-holding performance of the bicycle sprocket in an inclination state where the bicycle chain is inclined toward the second axial area relative to the bicycle sprocket.

In accordance with a fourteenth aspect of the present invention, the bicycle sprocket according to any one of the first to seventh, eleventh, and twelfth aspects is configured so that the at least one second tooth has a second tooth-tip center plane and a second tooth-bottom center plane. The second tooth-tip center plane is offset from the second tooth-bottom center plane toward the second axial surface in the axial direction.

With the bicycle sprocket according to the fourteenth aspect, the at least one chain-supporting portion can further improve chain-holding performance of the bicycle sprocket in an inclination state where the bicycle chain is inclined toward the second axial area relative to the bicycle sprocket.

In accordance with a fifteenth aspect of the present invention, the bicycle sprocket according to any one of the first to seventh, eleventh, and twelfth aspects is configured so that the at least one first tooth has a first tooth-tip center plane and a first tooth-bottom center plane. The first tooth-tip center plane is offset from first tooth-bottom center plane toward the second axial surface in the axial direction. The at least one second tooth has a second tooth-tip center plane a second tooth-bottom center plane. The second tooth-tip center plane is offset from the second tooth-bottom center plane toward the second axial surface in the axial direction.

With the bicycle sprocket according to the fifteenth aspect, the at least one chain-supporting portion can further improve chain-holding performance of the bicycle sprocket in an inclination state where the bicycle chain is inclined toward the second axial area relative to the bicycle sprocket.

In accordance with a sixteenth aspect of the present invention, the bicycle sprocket according to any one of the sixth to fifteenth aspects is configured so that the at least one chain-supporting portion has a tip-center plane and a bottom-center plane. The tip-center plane is offset from the bottom-center plane away from the reference axial center plane in the axial direction.

With the bicycle sprocket according to the sixteenth aspect, the at least one chain-supporting portion can further improve chain-holding performance of the bicycle sprocket in an inclination state where the bicycle chain is inclined relative to the bicycle sprocket toward an axial area which is defined on one side of the reference axial center plane.

In accordance with a seventeenth aspect of the present invention, the bicycle sprocket according to any one of the first to sixteenth aspects is configured so that a radial length of the at least one chain-supporting portion is larger than a radial length of the at least one of the at least one first tooth and the at least one second tooth.

With the bicycle sprocket according to the seventeenth aspect, the at least one chain-supporting portion can further improve chain-holding performance of the bicycle sprocket.

In accordance with an eighteenth aspect of the present invention, the bicycle sprocket according to any one of the first to seventeenth aspects is configured so that the at least one first tooth has a first maximum axial width defined in the axial direction. The at least one second tooth has a second maximum axial width defined in the axial direction, the second maximum axial width being equal to the first maximum axial width.

With the bicycle sprocket according to the eighteenth aspect, it is possible to save weight of the bicycle sprocket with improving chain-holding performance of the bicycle sprocket.

In accordance with a nineteenth aspect of the present invention, the bicycle sprocket according to the eighteenth aspect is configured so that the at least one chain-supporting portion has a third maximum axial width defined in the axial direction, the third maximum axial width being equal to or smaller than each of the first maximum axial width and the second maximum axial width.

With the bicycle sprocket according to the nineteenth aspect, it is possible to reduce increase in weight of the bicycle sprocket caused by the at least one chain-supporting portion.

In accordance with a twentieth aspect of the present invention, the bicycle sprocket according to any one of the first to nineteenth aspects is configured so that the sprocket body includes a first axial surface, a second axial surface, and a reference axial center plane. The second axial surface is opposite to the first axial surface in the axial direction. The reference axial center plane is defined at a center between the first axial surface and the second axial surface in the axial direction. The at least one second tooth is disposed on the reference axial center plane.

With the bicycle sprocket according to the twentieth aspect, it is possible to set a chain line of the bicycle chain with the at least one second tooth received within the inner link space to hold the pair of inner link plates.

In accordance with a twenty-first aspect of the present invention, a bicycle crank assembly comprises a bicycle crank arm and the bicycle sprocket according to any one of the first to twentieth aspects. The bicycle sprocket is a solitary sprocket attached to the bicycle crank arm.

With the bicycle crank assembly according to the twenty-first aspect, it is possible to provide the bicycle crank assembly having the effect obtained by the bicycle sprocket.

In accordance with a twenty-second aspect of the present invention, the bicycle sprocket according to any one of the first to twentieth aspect is configured so that the at least one chain-supporting portion includes a plurality of chain-supporting portions.

With the bicycle sprocket according to the twenty-second aspect, the plurality of chain-supporting portions can further improve the chain-holding performance of the bicycle sprocket in the inclination state of the bicycle chain.

In accordance with a twenty-third aspect of the present invention, a bicycle sprocket comprises a sprocket body, a plurality of sprocket teeth, and at least one chain-supporting portion. The plurality of sprocket teeth is circumferentially arranged on an outer periphery of the sprocket body. At least one of the plurality of sprocket teeth has a tooth-tip center plane and a tooth-bottom center plane. The tooth-tip center plane is offset from the tooth-bottom center plane in an axial direction parallel to a rotational center axis of the bicycle sprocket. The at least one of the plurality of sprocket teeth is arranged on the outer periphery to be received within a link-plate space defined between a pair of link plates of a bicycle chain. The at least one chain-supporting portion is spaced apart from the plurality of sprocket teeth in the axial direction without being received within the link-plate space of the bicycle chain in a state where the plurality of the sprocket teeth engages with the bicycle chain.

With the bicycle sprocket according to the twenty-third aspect, the at least one chain-supporting portion can improve chain-holding performance of the bicycle sprocket in the inclination state of the bicycle chain.

In accordance with a twenty-fourth aspect of the present invention, the bicycle sprocket according to the twenty-third aspect is configured so that each of the plurality of sprocket teeth has the tooth-tip center plane and the tooth-bottom center plane. Each of the plurality of sprocket teeth is arranged on the outer periphery to be received within the link-plate space.

With the bicycle sprocket according to the twenty-fourth aspect, the at least one chain-supporting portion can improve chain-holding performance of the bicycle sprocket in the inclination state of the bicycle chain.

In accordance with a twenty-fifth aspect of the present invention, the bicycle sprocket according to the twenty-third aspect is configured so that the at least one chain-supporting portion includes a plurality of chain-supporting portions.

With the bicycle sprocket according to the twenty-fifth aspect, the at least one chain-supporting portion and the plurality of sprocket teeth can improve chain-holding performance of the bicycle sprocket in the inclination state of the bicycle chain.

In accordance with a twenty-sixth aspect of the present invention, a bicycle sprocket comprises a sprocket body, a plurality of sprocket teeth, and at least one chain-supporting portion. The plurality of sprocket teeth is circumferentially arranged on an outer periphery of the sprocket body. At least one of the plurality of sprocket teeth is arranged on the outer periphery to be received within a link-plate space defined between a pair of link plates of a bicycle chain. The at least one chain-supporting portion is spaced apart from the plurality of sprocket teeth in the axial direction without being received within the link-plate space of the bicycle chain. A radial length of the at least one chain-supporting portion is larger than a radial length of at least one of the plurality of sprocket teeth.

With the bicycle sprocket according to the twenty-sixth aspect, the at least one chain-supporting portion and the plurality of sprocket teeth can improve chain-holding performance of the bicycle sprocket in the inclination state of the bicycle chain.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
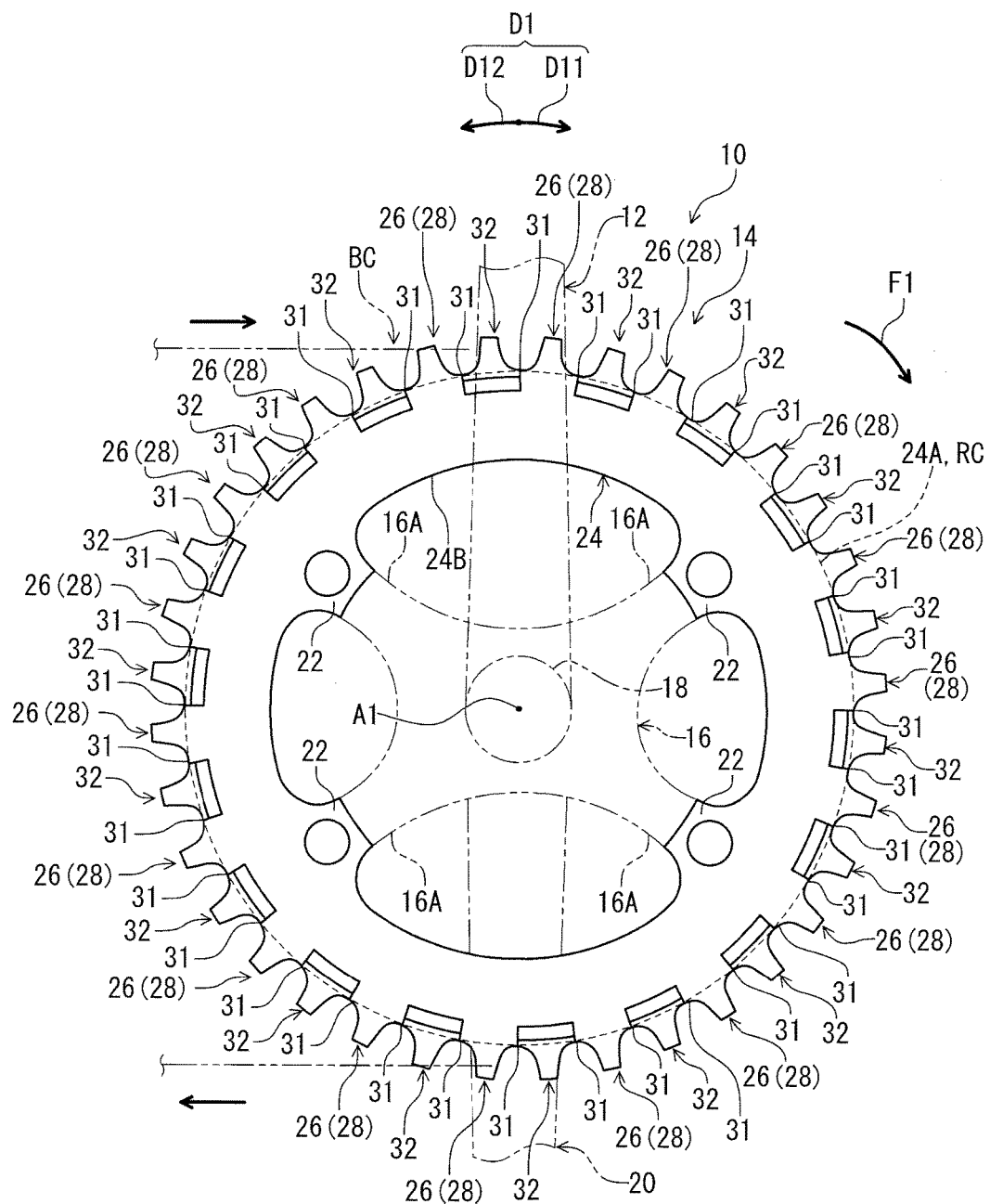
FIG. 1 is a side elevational view of a bicycle crank assembly including a bicycle sprocket in accordance with a first embodiment.

The embodiment(s) will now be described with reference to the accompanying drawings, wherein like reference numerals designate corresponding or identical elements throughout the various drawings.

Figure 2:
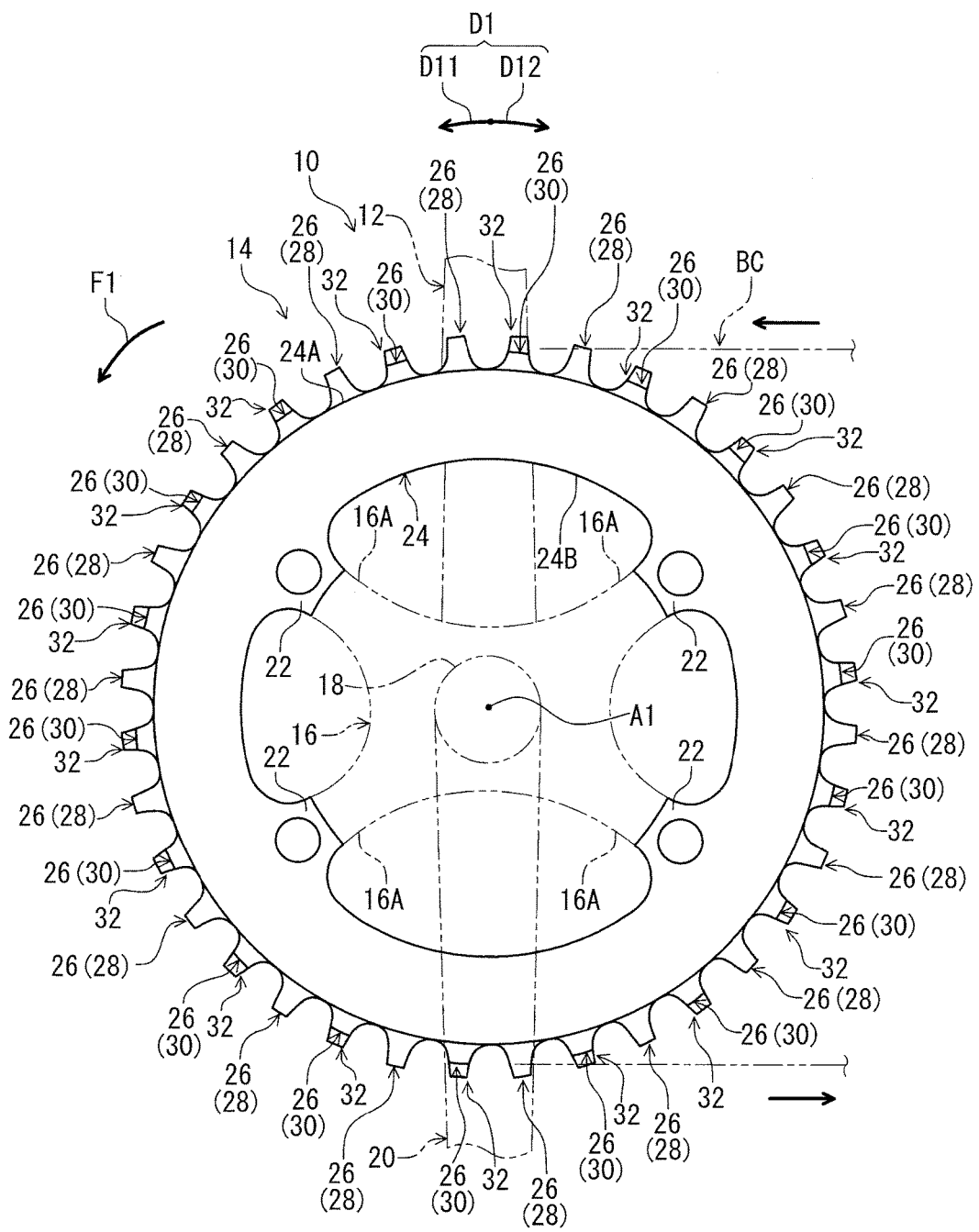
FIG. 2 is another side elevational view of the bicycle crank assembly illustrated in FIG. 1.

Referring initially to FIGS. 1 and 2, a bicycle crank assembly 10 in accordance with a first embodiment is illustrated. The bicycle crank assembly 10 comprises a bicycle crank arm 12 and a bicycle sprocket 14. In this embodiment, the bicycle sprocket 14 is a solitary sprocket attached to the bicycle crank arm 12. The bicycle crank arm 12 is a right crank arm. The bicycle crank assembly 10 and the bicycle sprocket 14 have a rotational center axis A1. The bicycle sprocket 14 is engaged with a bicycle chain BC to transmit a rotational driving force F1 to the bicycle chain BC.

Figure 3:
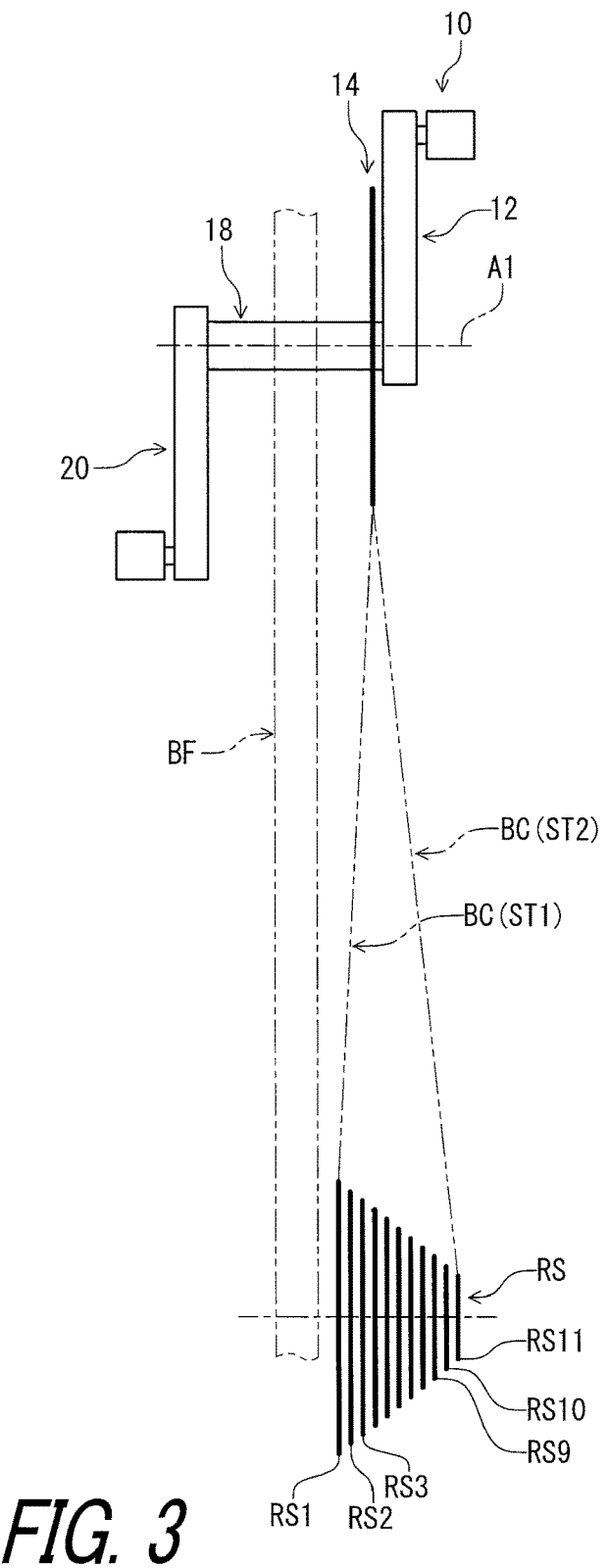
FIG. 3 is a schematic diagram of the bicycle crank assembly illustrated in FIG. 1, with a bicycle chain and a rear sprocket assembly.

As seen in FIG. 3, the bicycle crank assembly 10 is rotatable about the rotational center axis A1 relative to a bicycle frame BF. In this embodiment, the bicycle sprocket 14 is a front sprocket. However a bicycle sprocket of the present invention can be applied to a rear sprocket. The bicycle chain BC is engaged with the bicycle sprocket 14 and a rear sprocket assembly RS.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket 14 and the bicycle crank assembly 10, should be interpreted relative to the bicycle equipped with the bicycle crank assembly 10 as used in an upright riding position on a horizontal surface.

As seen in FIGS. 1 and 2, the bicycle crank assembly 10 further comprises a sprocket mounting member 16, a crank axle 18, and an additional bicycle crank arm 20. The bicycle crank arm 12 and the additional bicycle crank arm 20 are secured to the crank axle 18. The sprocket mounting member 16 is secured to the bicycle crank arm 12. The sprocket mounting member 16 includes crank connecting arms 16A. The bicycle sprocket 14 comprises crank attachment portions 22. The crank connecting arms 16A are respectively fastened to the crank attachment portions 22 with fasteners such as bolts (not shown). The bicycle sprocket 14 can be directly attached to the bicycle crank arm 12 without the sprocket mounting member 16. In such a configuration, the bicycle sprocket 14 can be engaged with a mounting boss of the bicycle crank arm 12 that protrudes from an end of the bicycle crank arm 12 in an axial direction D2 parallel to the rotational center axis A1.

The bicycle sprocket 14 is rotatable integrally with the sprocket mounting member 16 and the bicycle crank arm 12 about the rotational center axis A1. The bicycle sprocket 14 is rotatable about the rotational center axis A1 in a driving rotational direction D11 during pedaling. The driving rotational direction D11 is defined along a circumferential direction D1 defined about the rotational center axis A1. A reversing rotational direction D12 is a reverse direction of the driving rotational direction D11 and is defined along the circumferential direction D1.

As seen in FIGS. 1 and 2, the bicycle sprocket 14 comprises a sprocket body 24. The sprocket body 24 includes an outer periphery 24A provided about the rotational center axis A1. The sprocket body 24 has an annular shape. The crank attachment portions 22 extend radially inward from an inner periphery 24B of the sprocket body 24.

As seen in FIG. 2, the bicycle sprocket 14 comprises a plurality of sprocket teeth 26. The plurality of sprocket teeth 26 is circumferentially arranged on an outer periphery 24A of the sprocket body 24. The plurality of sprocket teeth 26 includes at least one first tooth 28 and at least one second tooth 30. The at least one first tooth 28 and the at least one second tooth 30 are alternatingly arranged on the outer periphery 24A of the sprocket body 24 in the circumferential direction D1 with respect to the rotational center axis A1.

In this embodiment, the bicycle sprocket 14 comprises a plurality of first teeth 28 and a plurality of second teeth 30. The plurality of first teeth 28 and the plurality of second teeth 30 are alternatingly arranged on the outer periphery 24A of the sprocket body 24 in the circumferential direction D1 with respect to the rotational center axis A1. In the illustrated embodiment, each of the plurality of the first teeth 28 are provided adjacent to the second tooth 30 without another tooth therebetween. A total number of the first teeth 28 is equal to a total number of the second teeth 30. However, the total number of the first teeth 28 and the total number of the second teeth 30 are not limited to this embodiment. The total number of the first teeth 28 can be different from the total number of the second teeth 30. The arrangement of the first teeth 28 and the second teeth 30 is not limited to this embodiment.

As seen in FIG. 1, the bicycle sprocket 14 comprises tooth bottoms 31. The tooth bottoms 31 are arranged between adjacent two teeth of the sprocket teeth 26 in the circumferential direction D1. The tooth bottoms 31 define a root circle RC. The outer periphery 24A of the sprocket body 24 coincides with the root circle RC.

Figure 4:
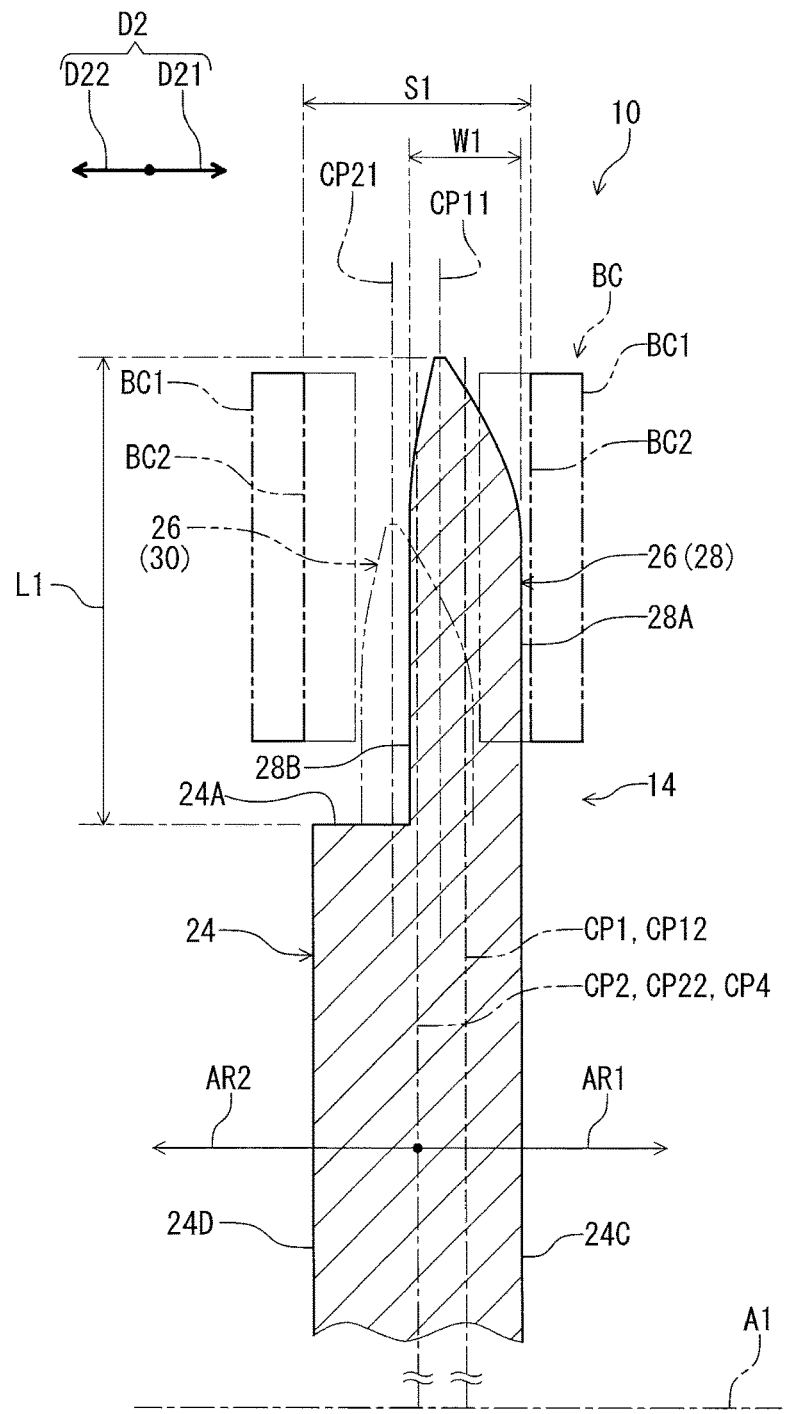
FIG. 4 is a cross-sectional view of the bicycle sprocket taken along line IV-IV of FIG. 6.

As seen in FIG. 4, the at least one first tooth 28 is arranged on the outer periphery 24A to be received within an outer link space S1 defined between a pair of outer link plates BC1 of the bicycle chain BC. The pair of outer link plates BC1 faces each other in the axial direction D2 parallel to the rotational center axis A1 of the bicycle sprocket 14. In this embodiment, each of the first teeth 28 is arranged on the outer periphery 24A to be received within the outer link space S1.

Figure 5:
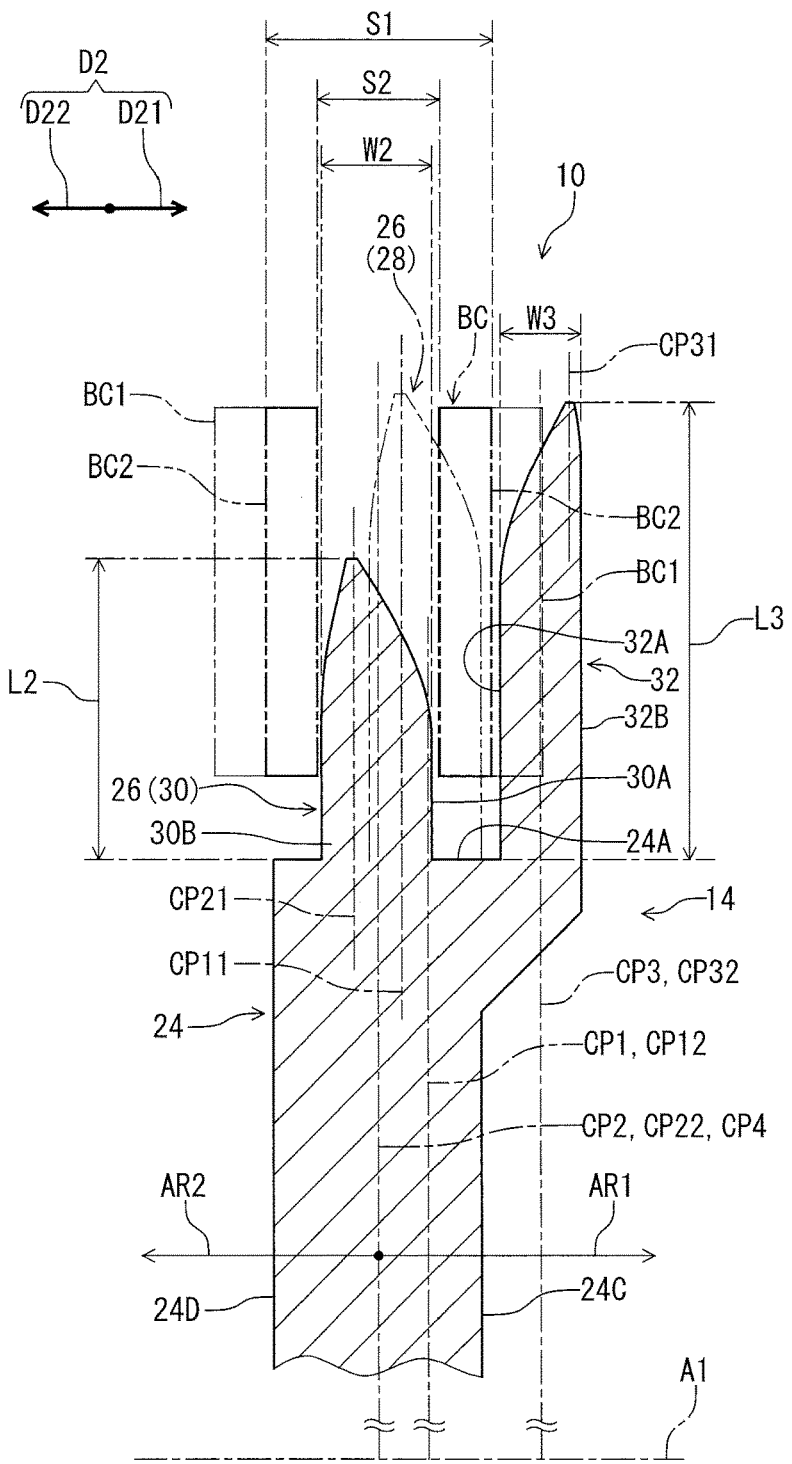
FIG. 5 is a cross-sectional view of the bicycle sprocket taken along line V-V of FIG. 6.

As seen in FIG. 5, the at least one second tooth 30 is arranged on the outer periphery 24A to be received within an inner link space S2 defined between a pair of inner link plates BC2 of the bicycle chain BC. The pair of inner link plates BC2 faces each other in the axial direction D2. In this embodiment, each of the second teeth 30 is arranged on the outer periphery 24A to be received within the inner link space S2.

The outer link space S1 can also be referred to as a link-plate space S1. The inner link space S2 can also be referred to as a link-plate space S2. The pair of outer link plates BC1 can also be referred to as a pair of link plates BC1. The pair of inner link plates BC2 can also be referred to as a pair of link plates BC2.

As seen in FIGS. 3 and 4, at least one of the plurality of sprocket teeth 26 is arranged on the outer periphery 24A to be received within the link-plate space S1 or S2 defined between the pair of link plates BC1 or BC2 of the bicycle chain BC. In this embodiment, each of the plurality of sprocket teeth 26 is arranged on the outer periphery 24A to be received within the link-plate space S1 or S2.

Figure 6:
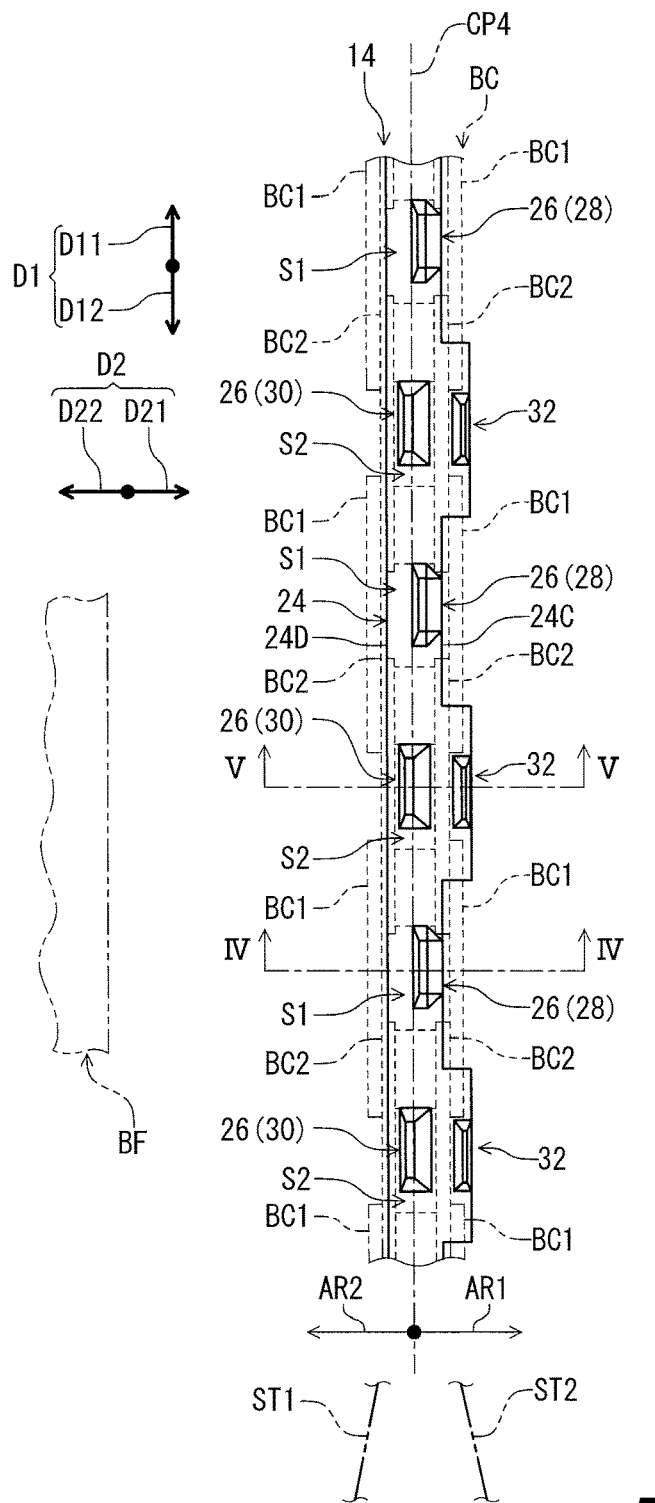
FIG. 6 is a development view of the bicycle sprocket illustrated in FIG. 1 when viewed from a radial direction of the bicycle sprocket, with the bicycle chain.

As seen in FIG. 6, the bicycle sprocket 14 comprises at least one chain-supporting portion 32 arranged on the sprocket body 24 to face the bicycle chain BC in the axial direction D2 parallel to the rotational center axis A1 of the bicycle sprocket 14 without being received within the outer link space S1 and the inner link space S2 in a state where the plurality of sprocket teeth 26 engages with the bicycle chain BC. The at least one chain-supporting portion 32 is spaced apart from the plurality of sprocket teeth 26 in the axial direction D2 without being received within the link-plate space S1 and S2 of the bicycle chain BC in the state where the plurality of the sprocket teeth 26 engages with the bicycle chain BC. The at least one chain-supporting portion 32 is spaced apart from the at least one of the at least one first tooth 28 and the at least one second tooth 30 in the axial direction D2.

In this embodiment, the at least one chain-supporting portion 32 includes a plurality of chain-supporting portions 32. However, a total number of the chain-supporting portions 32 is not limited to this embodiment. Each of the chain-supporting portions 32 is arranged on the sprocket body 24 to face the bicycle chain BC in the axial direction D2 without being received within the outer link space S1 and the inner link space S2 in the state where the plurality of sprocket teeth 26 engages with the bicycle chain BC. Each of the chain-supporting portion 32 is spaced apart from the plurality of sprocket teeth 26 in the axial direction D2 without being received within the link-plate spaces S1 and S2 of the bicycle chain BC in the state where the plurality of the sprocket teeth 26 engages with the bicycle chain BC.

As seen in FIGS. 4 and 5, the at least one chain-supporting portion 32 is arranged on the sprocket body 24 to face at least one of the at least one first tooth 28 and the at least one second tooth 30 in the axial direction D2. The at least one chain-supporting portion 32 faces the at least one second tooth 30 in the axial direction D2. In this embodiment, as seen in FIGS. 5 and 6, the chain-supporting portions 32 are arranged on the sprocket body 24 to respectively face the plurality of second teeth 30 in the axial direction D2. The total number of the chain-supporting portions 32 is equal to the total number of the second teeth 30. However, the total number of the chain-supporting portions 32 can be different from the total number of the second teeth 30.

As seen in FIGS. 5 and 6, the at least one chain-supporting portion 32 is arranged on the sprocket body 24 to support the bicycle chain BC so that the bicycle chain BC is partly positioned between the at least one chain-supporting portion 32 and the at least one of the at least one first tooth 28 and the at least one second tooth 30 in the axial direction D2. In this embodiment, the chain-supporting portion 32 is arranged on the sprocket body 24 to support the bicycle chain BC so that the bicycle chain BC is partly positioned between the chain-supporting portion 32 and the second tooth 30 in the axial direction D2. More specifically, one of the pair of inner link plates BC2 is positioned between the chain-supporting portion 32 and the second tooth 30 in the axial direction D2.

As seen in FIG. 4, the at least one first tooth 28 includes a first axial center plane CP1 defined at a center of the at least one first tooth 28 in the axial direction D2. In this embodiment, the first tooth 28 includes a first chain-engagement surface 28A and a first reverse surface 28B. The first chain-engagement surface 28A is contactable with one of the pair of outer link plates BC1 of the bicycle chain BC. The first reverse surface 28B is provided on a reverse side of the first chain-engagement surface 28A in the axial direction D2. The first axial center plane CP1 is perpendicular to the rotational center axis A1. The first axial center plane CP1 is defined at a center between the first chain-engagement surface 28A and the first reverse surface 28B in the axial direction D2.

As seen in FIG. 5, the at least one second tooth 30 includes a second axial center plane CP2 defined at a center of the at least one second tooth 30 in the axial direction D2. In this embodiment, the second tooth 30 includes a second chain-engagement surface 30A and a second additional chain-engagement surface 30B. The second chain-engagement surface 30A is contactable with one of the pair of inner link plates BC2 of the bicycle chain BC. The second additional chain-engagement surface 30B is contactable with the other of the pair of inner link plates BC2 of the bicycle chain BC. The second additional chain-engagement surface 30B is provided on a reverse side of the second chain-engagement surface 30A in the axial direction D2. The second axial center plane CP2 is perpendicular to the rotational center axis A1. The second axial center plane CP2 is defined at a center between the second chain-engagement surface 30A and the second additional chain-engagement surface 30B in the axial direction D2. As seen in FIGS. 4 and 5, the first axial center plane CP1 and the second axial center plane CP2 are offset from each other in the axial direction D2.

As seen in FIG. 5, the at least one chain-supporting portion 32 includes a third axial center plane CP3 defined at a center of the at least one chain-supporting portion 32 in the axial direction D2. In this embodiment, the chain-supporting portion 32 includes a chain-supporting surface 32A and a supporting reverse surface 32B. The chain-supporting surface 32A faces in the axial direction D2 and is contactable with the bicycle chain BC. The supporting reverse surface 32B faces in the axial direction D2 and is provided on a reverse side of the chain-supporting surface 32A in the axial direction D2. The third axial center plane CP3 is perpendicular to the rotational center axis A1. The third axial center plane CP3 is defined at a center between the chain-supporting surface 32A and the supporting reverse surface 32B in the axial direction D2. The third axial center plane CP3 is offset from the first axial center plane CP1 and the second axial center plane CP2 in the axial direction D2. More specifically, in the illustrated embodiment, the first axial center plane CP1 is disposed between the second axial center plane CP2 and the third axial center plane CP3 in the axial direction D2.

As seen in FIG. 4, the sprocket body 24 includes a first axial surface 24C and a second axial surface 24D. The second axial surface 24D is opposite to the first axial surface 24C in the axial direction D2. The second axial surface 24D is disposed on a reverse side of the first axial surface 24C in the axial direction D2. The first axial surface 24C faces in a first axial direction D21 defined along the axial direction D2. The second axial surface 24D faces in a second axial direction D22 defined along the axial direction D2. The second axial direction D22 is a reverse direction of the first axial direction D21 and is opposite to the first axial direction D21.

Figure 7:
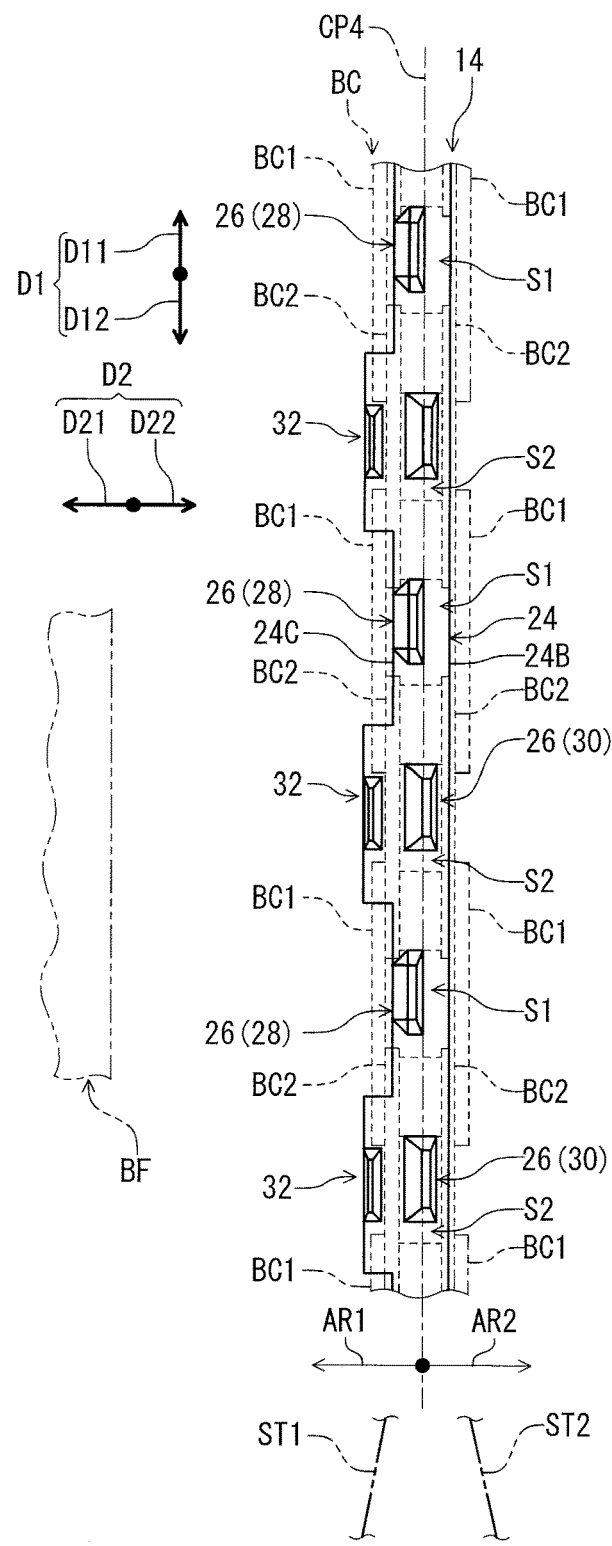
FIG. 7 is a development view of the bicycle sprocket illustrated in FIG. 1 when viewed from the radial direction of the bicycle sprocket, with the bicycle chain (modification).

In this embodiment, as seen in FIG. 6, the second axial surface 24D faces toward the bicycle frame BF in the axial direction D2 in a mounting state (FIG. 3) where the bicycle sprocket 14 is mounted to the bicycle frame BF. In other words, the second axial surface 24D is disposed on an axially inward side of the first axial surface 24C in the mounting state of the bicycle sprocket 14. As seen in FIG. 7, however, the first axial surface 24C can face toward the bicycle frame BF in the axial direction D2 in the mounting state of the bicycle sprocket 14.

As seen in FIG. 4, the first chain-engagement surface 28A faces in the first axial direction D21. The first reverse surface 28B faces in the second axial direction D22. As seen in FIG. 5, the second chain-engagement surface 30A faces in the first axial direction D21. The second additional chain-engagement surface 30B faces in the second axial direction D22.

As seen in FIG. 4, the sprocket body 24 includes a reference axial center plane CP4 defined at a center between the first axial surface 24C and the second axial surface 24D in the axial direction D2. The first axial center plane CP1 is offset from the reference axial center plane CP4 toward the first axial surface 24C in the axial direction D2. The first axial surface 24C is disposed closer to the at least one first tooth 28 than the second axial surface 24D in the axial direction D2. In this embodiment, the first axial surface 24C is disposed closer to each of the first teeth 28 than the second axial surface 24D in the axial direction D2.

As seen in FIG. 5, the at least one second tooth 30 is disposed on the reference axial center plane CP4. The at least one second tooth 30 is disposed to at least partly overlap with the reference axial center plane CP4 when viewed from a direction perpendicular to the rotational center axis A1. In this embodiment, the second axial center plane CP2 coincides with the reference axial center plane CP4.

The reference axial center plane CP4 defines a first axial area AR1 and a second axial area AR2 opposite to the first axial area AR1 relative to the reference axial center plane CP4 in the axial direction D2. The first axial surface 24C and the first axial center plane CP1 are arranged in the first axial area AR1. The second axial surface 24D is arranged in the second axial area AR2. The at least one chain-supporting portion 32 is arranged in the first axial area AR1. In this embodiment, each of the chain-supporting portions 32 is arranged in the first axial area AR1.

As seen in FIG. 4, the at least one first tooth 28 has a first maximum axial width W1 defined in the axial direction D2. In this embodiment, each of the first teeth 28 has the first maximum axial width W1. The first maximum axial width W1 is defined between the first chain-engagement surface 28A and the first reverse surface 28B in the axial direction D2. The first axial center plane CP1 bisects the first maximum axial width W1.

As seen in FIG. 5, the at least one second tooth 30 has a second maximum axial width W2 defined in the axial direction D2. In this embodiment, each of the second teeth 30 has the second maximum axial width W2. The second maximum axial width W2 is defined between the second chain-engagement surface 30A and the second additional chain-engagement surface 30B in the axial direction D2. The second axial center plane CP2 bisects the second maximum axial width W2. As seen in FIGS. 4 and 5, the second maximum axial width W2 is equal to the first maximum axial width W1.

As seen in FIG. 5, the at least one chain-supporting portion 32 has a third maximum axial width W3 defined in the axial direction D2. In this embodiment, each of the chain-supporting portions 32 has the third maximum axial width W3. The third maximum axial width W3 is defined between the chain-supporting surface 32A and the supporting reverse surface 32B in the axial direction D2. The third axial center plane CP3 bisects the third maximum axial width W3.

As seen in FIGS. 4 and 5, the third maximum axial width W3 is equal to or smaller than each of the first maximum axial width W1 and the second maximum axial width W2. Specifically, the third maximum axial width W3 is smaller than each of the first maximum axial width W1 and the second maximum axial width W2.

Figure 8:
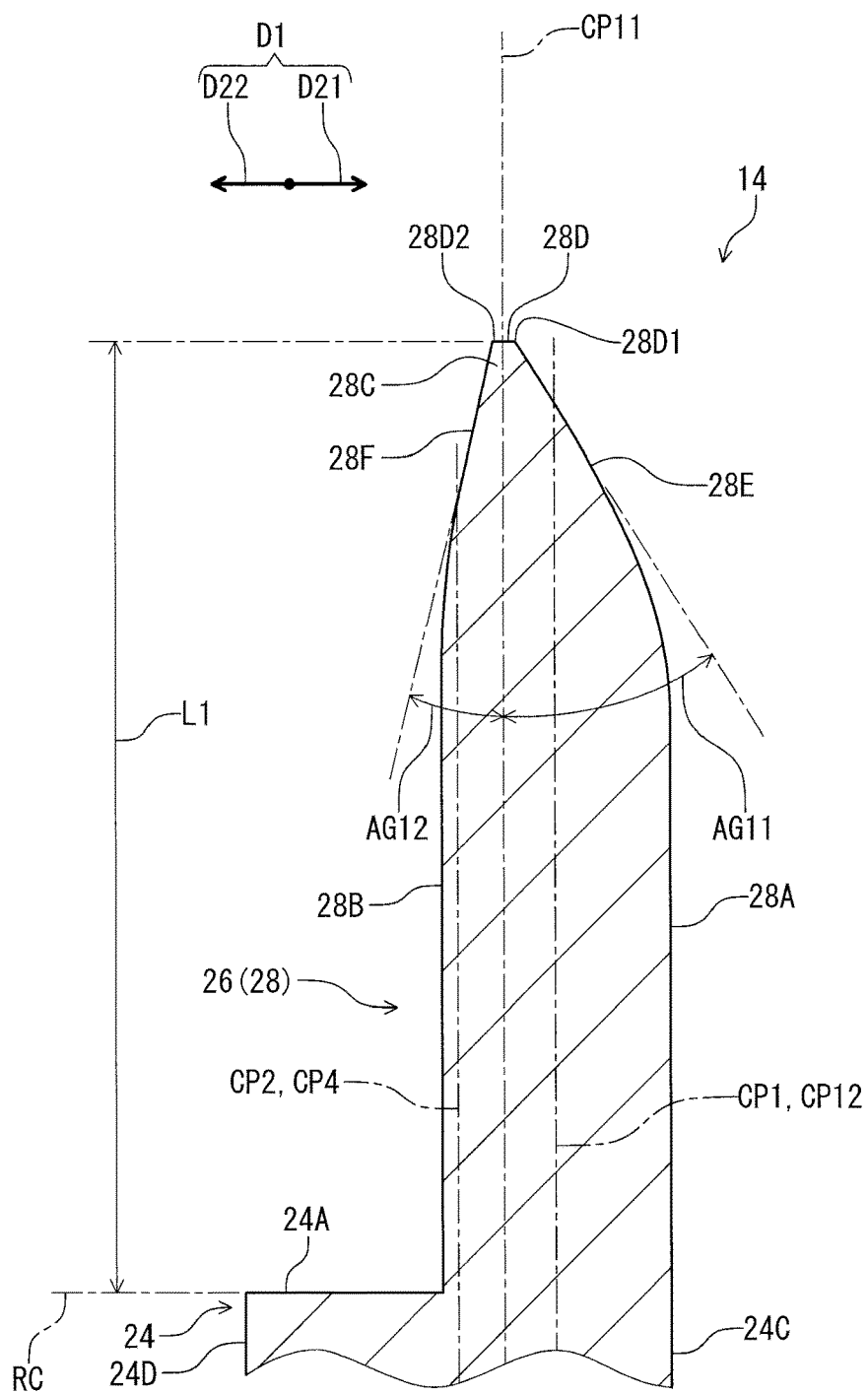
FIG. 8 is a partial enlarged cross-sectional view of the bicycle sprocket illustrated in FIG. 4.

As seen in FIG. 8, the at least one first tooth 28 has a first tooth-tip center plane CP11 and a first tooth-bottom center plane CP12. The first tooth-tip center plane CP11 is offset from the first tooth-bottom center plane CP12 toward the second axial surface 24D in the axial direction D2. The first tooth 28 includes a first tooth tip 28C. The first tooth tip 28C defines the first tooth-tip center plane CP11. The first tooth tip 28C includes a first end surface 28D. The first end surface 28D includes a first edge 28D1 and a first additional edge 28D2. The first tooth-tip center plane CP11 is defined at a center between the first edge 28D1 and the first additional edge 28D2 in the axial direction D2. The first tooth-bottom center plane CP12 coincides with the first axial center plane CP1.

The first tooth 28 includes a first inclined surface 28E and a first additional inclined surface 28F. The first inclined surface 28E extends from the first end surface 28D (the first edge 28D1) to the first chain-engagement surface 28A. The first additional inclined surface 28F extends from the first end surface 28D (the first additional edge 28D2) to the first reverse surface 28B.

A first inclined angle AG11 is defined between the first inclined surface 28E and the first tooth-tip center plane CP11. A first additional inclined angle AG12 is defined between the first additional inclined surface 28F and the first tooth-tip center plane CP11. The first inclined angle AG11 is larger than the first additional inclined angle AG12.

Figure 9:
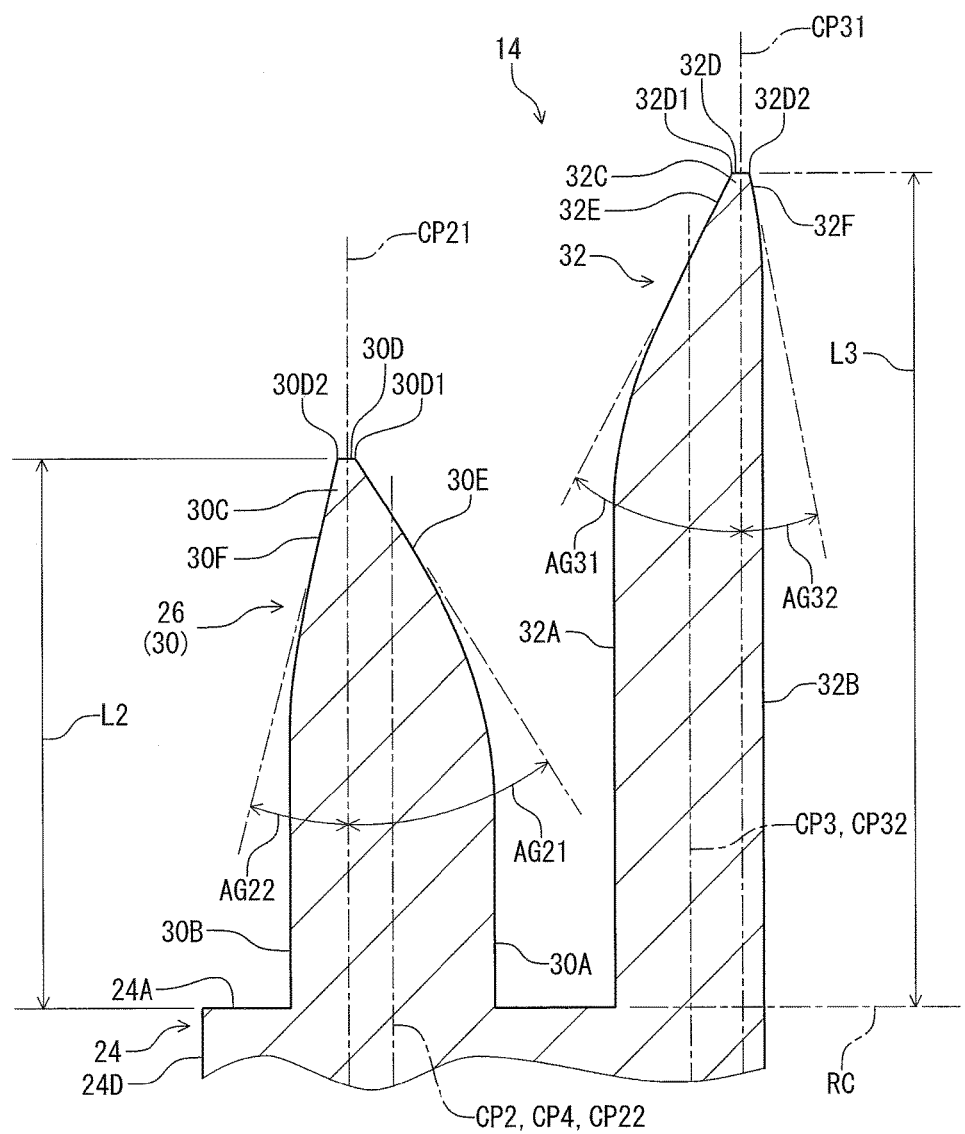
FIG. 9 is a partial enlarged cross-sectional view of the bicycle sprocket illustrated in FIG. 5.

As seen in FIG. 9, the at least one second tooth 30 has a second tooth-tip center plane CP21 and a second tooth-bottom center plane CP22. The second tooth-tip center plane CP21 is offset from the second tooth-bottom center plane CP22 toward the second axial surface 24D in the axial direction D2. The second tooth 30 includes a second tooth tip 30C. The second tooth tip 30C defines the second tooth-tip center plane CP21. The second tooth tip 30C includes a second end surface 30D. The second end surface 30D includes a second edge 30D1 and a second additional edge 30D2. The second tooth-tip center plane CP21 is defined at a center between the second edge 30D1 and the second additional edge 30D2 in the axial direction D2. The second tooth-bottom center plane CP22 coincides with the second axial center plane CP2.

The second tooth 30 includes a second inclined surface 30E and a second additional inclined surface 30F. The second inclined surface 30E extends from the second end surface 30D (the second edge 30D1) to the second chain-engagement surface 30A. The second additional inclined surface 30F extends from the second end surface 30D (the second additional edge 30D2) to the second additional chain-engagement surface 30B.

A second inclined angle AG21 is defined between the second inclined surface 30E and the second tooth-tip center plane CP21. A second additional inclined angle AG22 is defined between the second additional inclined surface 30F and the second tooth-tip center plane CP21. The second inclined angle AG21 is larger than the second additional inclined angle AG22.

The first tooth-tip center plane CP11 can also be referred to as a tooth-tip center plane CP11. The first tooth-bottom center plane CP12 can also be referred to as a tooth-bottom center plane CP12. The second tooth-tip center plane CP21 can also be referred to as a tooth-tip center plane CP21. The second tooth-bottom center plane CP22 can also be referred to as a tooth-bottom center plane CP22.

As seen in FIGS. 8 and 9, at least one of the plurality of sprocket teeth 26 has the tooth-tip center plane CP11 or CP21 and the tooth-bottom center plane CP12 or CP22. In this embodiment, each of the plurality of sprocket teeth 26 has the tooth-tip center plane CP11 or CP21. Each of the plurality of sprocket teeth 26 has the tooth-bottom center plane CP12 or CP22. The tooth-tip center plane CP11 is offset from the tooth-bottom center plane CP12 in the axial direction D2 parallel to the rotational center axis A1 of the bicycle sprocket 14. The tooth-tip center plane CP21 is offset from the tooth-bottom center plane CP22 in the axial direction D2.

As seen in FIG. 9, the at least one chain-supporting portion 32 has a tip-center plane CP31 and a bottom-center plane CP32. The tip-center plane CP31 is offset from the bottom-center plane CP32 away from the reference axial center plane CP4 in the axial direction D2. The chain-supporting portion 32 includes a chain-supporting tip 32C. The chain-supporting tip 32C defines the tip-center plane CP31. The chain-supporting tip 32C includes a third end surface 32D. The third end surface 32D includes a third edge 32D1 and a third additional edge 32D2. The tip-center plane CP31 is defined at a center between the third edge 32D1 and the third additional edge 32D2 in the axial direction D2. The bottom-center plane CP32 coincides with the third axial center plane CP3.

The chain-supporting portion 32 includes a third inclined surface 32E and a third additional inclined surface 32F. The third inclined surface 32E extends from the third end surface 32D (the third edge 32D1) to the chain-supporting surface 32A. The third additional inclined surface 32F extends from the third end surface 32D (the third additional edge 32D2) to the supporting reverse surface 32B.

A third inclined angle AG31 is defined between the third inclined surface 32E and the tip-center plane CP31. A third additional inclined angle AG32 is defined between the third additional inclined surface 32F and the tip-center plane CP31. The third inclined angle AG31 is larger than the third additional inclined angle AG32.

As seen in FIGS. 8 and 9, a radial length of the at least one chain-supporting portion 32 is larger than a radial length of the at least one of the at least one first tooth 28 and the at least one second tooth 30. The radial length of the at least one chain-supporting portion 32 is larger than a radial length of at least one of the plurality of sprocket teeth 26.

As seen in FIG. 8, the first tooth 28 has a first radial length L1. The first radial length L1 is defined radially outward from the outer periphery 24A of the sprocket body 24 (the root circle RC) to the first tooth tip 28C (the first end surface 28D).

As seen in FIG. 9, the second tooth 30 has a second radial length L2. The second radial length L2 is defined radially outward from the outer periphery 24A of the sprocket body 24 (the root circle RC) to the second tooth tip 30C (the second end surface 30D). The chain-supporting portion 32 has a third radial length L3. The third radial length L3 is defined radially outward from the outer periphery 24A of the sprocket body 24 (the root circle RC) to the chain-supporting tip 32C (the third end surface 32D).

As seen in FIGS. 8 and 9, the third radial length L3 of the chain-supporting portion 32 is larger than the second radial length L2 of the second tooth 30. The first radial length L1 of the first tooth 28 is larger than the second radial length L2 of the second tooth 30. The third radial length L3 of the chain-supporting portion 32 is equal to the first radial length L1 of the first tooth 28. However, dimensional relationship among the first radial length L1, the second radial length L2 and the third radial length L3 is not limited to the illustrated embodiment. For example, the second radial length L2 can be equal to or larger than at least one of the first radial length L1 and the third radial length L3.

As seen in FIGS. 3 and 6, the bicycle chain BC can be engaged with the plurality of sprocket teeth 26 in an inclination state where the bicycle chain BC is inclined relative to the bicycle sprocket 14 when viewed from a radial direction perpendicular to the rotational center axis A1. Specifically, the bicycle chain BC can be engaged with the plurality of sprocket teeth 26 in an inward inclination state ST1 where the bicycle chain BC is inclined toward the bicycle frame BF relative to the bicycle sprocket 14 when viewed from the radial direction. For example, in the inward inclination state ST1, the bicycle chain BC is engaged with one of rear sprockets of the rear sprocket assembly RS that is disposed closer to a bicycle axial center plane that is defined as a plane bisecting the bicycle frame BF in the axial direction D2. In the inward inclination state ST1, for example, the bicycle chain BC is engaged with the bicycle sprocket 14 and one of first to third rear sprockets RS1 to RS3 of a rear sprocket assembly RS.

Furthermore, the bicycle chain BC can be engaged with the plurality of sprocket teeth 26 in an outward inclination state ST2 where the bicycle chain BC is inclined toward an opposite side of the bicycle frame BF relative to the bicycle sprocket 14 when viewed from the radial direction. For example, in the outward inclination state ST2, the bicycle chain BC is engaged with one of rear sprockets of the rear sprocket assembly RS that is disposed farther from the axial center plane of a bicycle than the bicycle sprocket 14. In the outward inclination state ST2, for example, the bicycle chain BC is engaged with the bicycle sprocket 14 and ninth to eleventh rear sprockets RS9 to RS11 of the rear sprocket assembly RS. In the inward inclination state ST1 and the outward inclination state ST2, chain-holding performance of the bicycle sprocket 14 is likely to reduce due to impact and/or vibration transmitted from a ground surface to a bicycle compared with a non-inclination state where the bicycle chain BC is not inclined relative to the bicycle sprocket 14 (i.e., a chain line is parallel to the bicycle sprocket 14).

With the bicycle sprocket 14, however, the at least one chain-supporting portion 32 can improve the chain-holding performance of the bicycle sprocket 14 in the inclination state of the bicycle chain BC since the at least one chain-supporting portion 32 is arranged on the sprocket body 24 to face the bicycle chain BC in the axial direction D2 without being received within the outer link space S1 and the inner link space S2.

Second Embodiment

A bicycle crank assembly 210 comprising a bicycle sprocket 214 in accordance with a second embodiment will be described below referring to FIGS. 10 to 15. The bicycle crank assembly 210 has the same structure and/or configuration as those of the bicycle crank assembly 10 except for the arrangement of the chain-supporting portion 32. Thus, elements having substantially the same function as those in the first embodiment will be numbered the same here, and will not be described and/or illustrated again in detail here for the sake of brevity.

Figure 10:
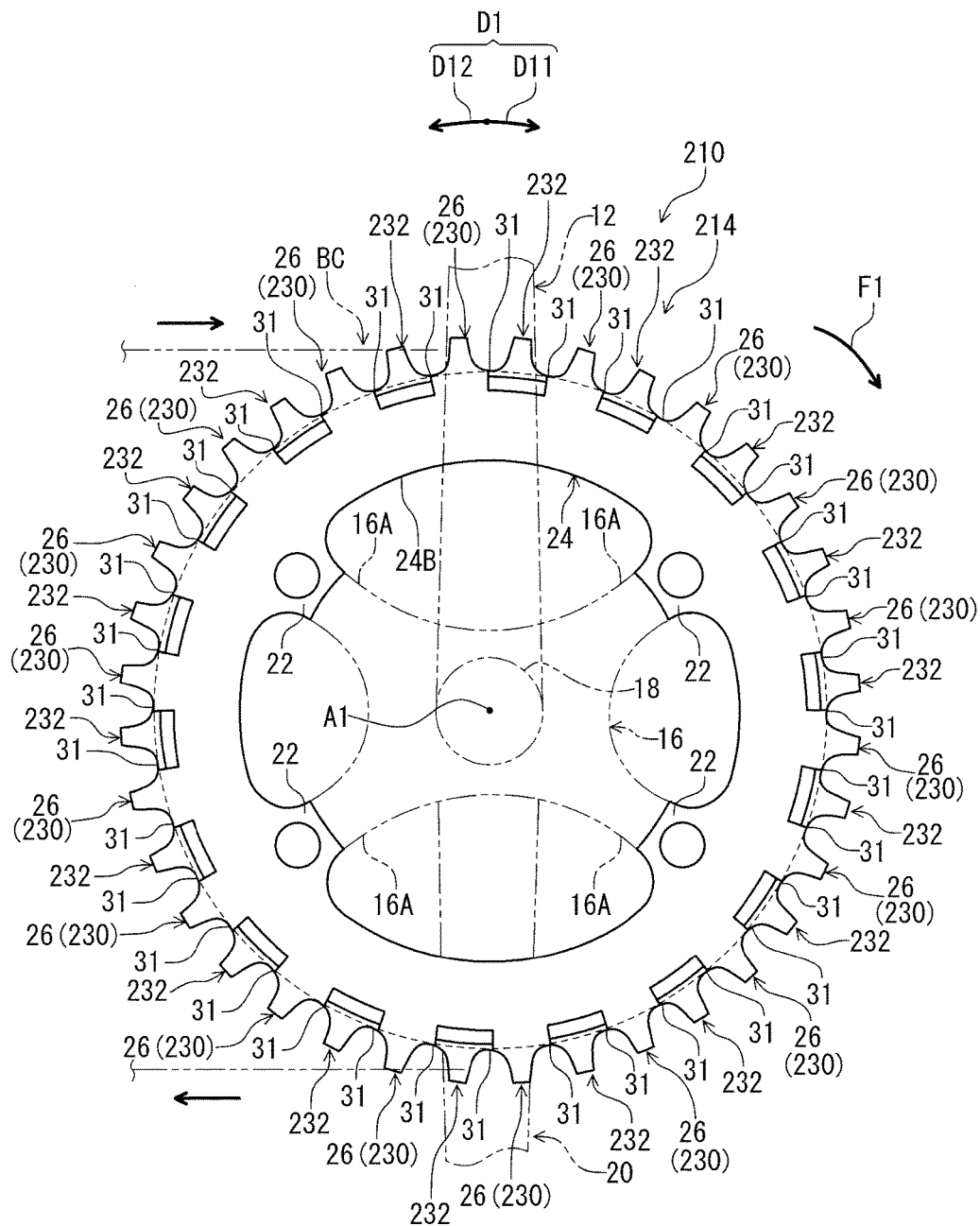
FIG. 10 is a side elevational view of a bicycle crank assembly including a bicycle sprocket in accordance with a second embodiment.
Figure 11:
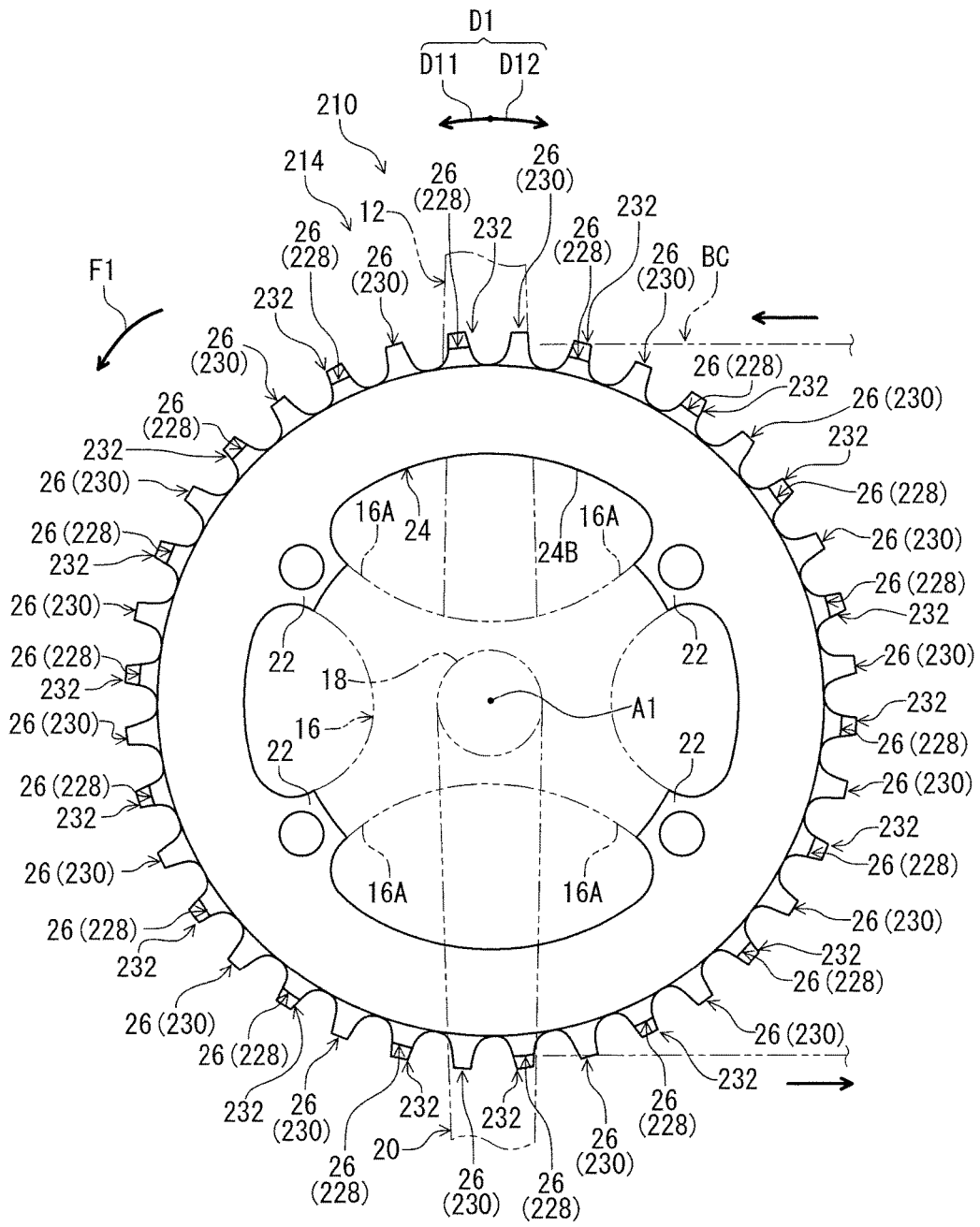
FIG. 11 is another side elevational view of the bicycle crank assembly illustrated in FIG. 10.

As seen in FIGS. 10 and 11, the bicycle sprocket 214 comprises the sprocket body 24, the plurality of sprocket teeth 26, and at least one chain-supporting portion 232. In this embodiment, the at least one chain-supporting portion 232 includes a plurality of chain-supporting portions 232. The plurality of sprocket teeth 26 includes at least one first tooth 228 and at least one second tooth 230. The plurality of sprocket teeth 26 includes a plurality of first teeth 228 and a plurality of second teeth 230. The chain-supporting portion 232 has substantially the same structure as that of the chain-supporting portion 32 of the first embodiment. The first tooth 228 has substantially the same structure as that of the first tooth 28 of the first embodiment. The second tooth 230 has substantially the same structure as that of the second tooth 30 of the first embodiment.

Figure 12:
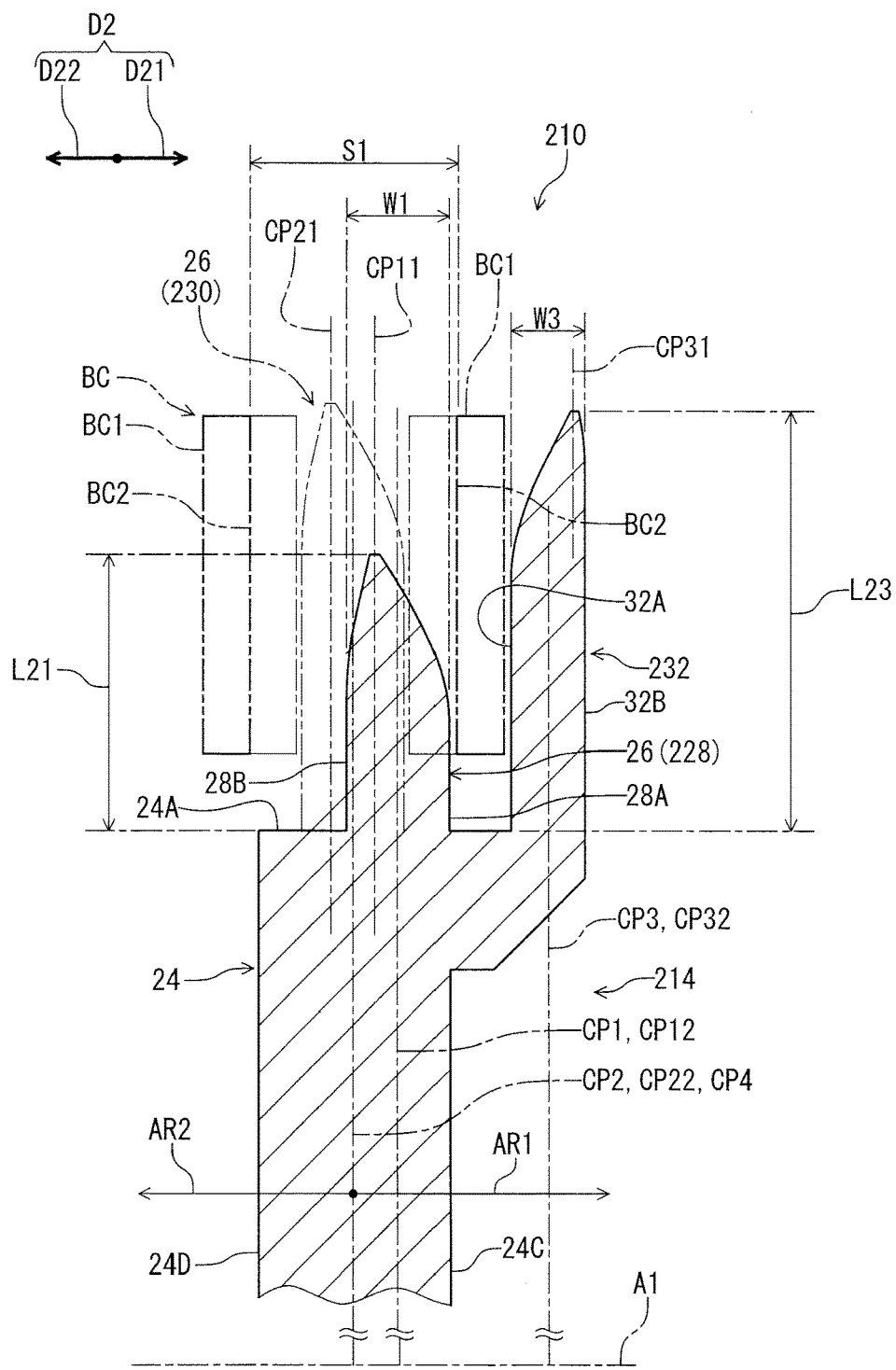
FIG. 12 is a cross-sectional view of the bicycle sprocket taken along line XII-XII of FIG. 14.

As seen in FIG. 12, however, the at least one chain-supporting portion 232 faces the at least one first tooth 228 in the axial direction D2. In this embodiment, the chain-supporting portions 232 respectively face the first teeth 228 in the axial direction D2. However, the chain-supporting portions 232 can be offset from the first teeth 228 in the circumferential direction D1.

Figure 13:
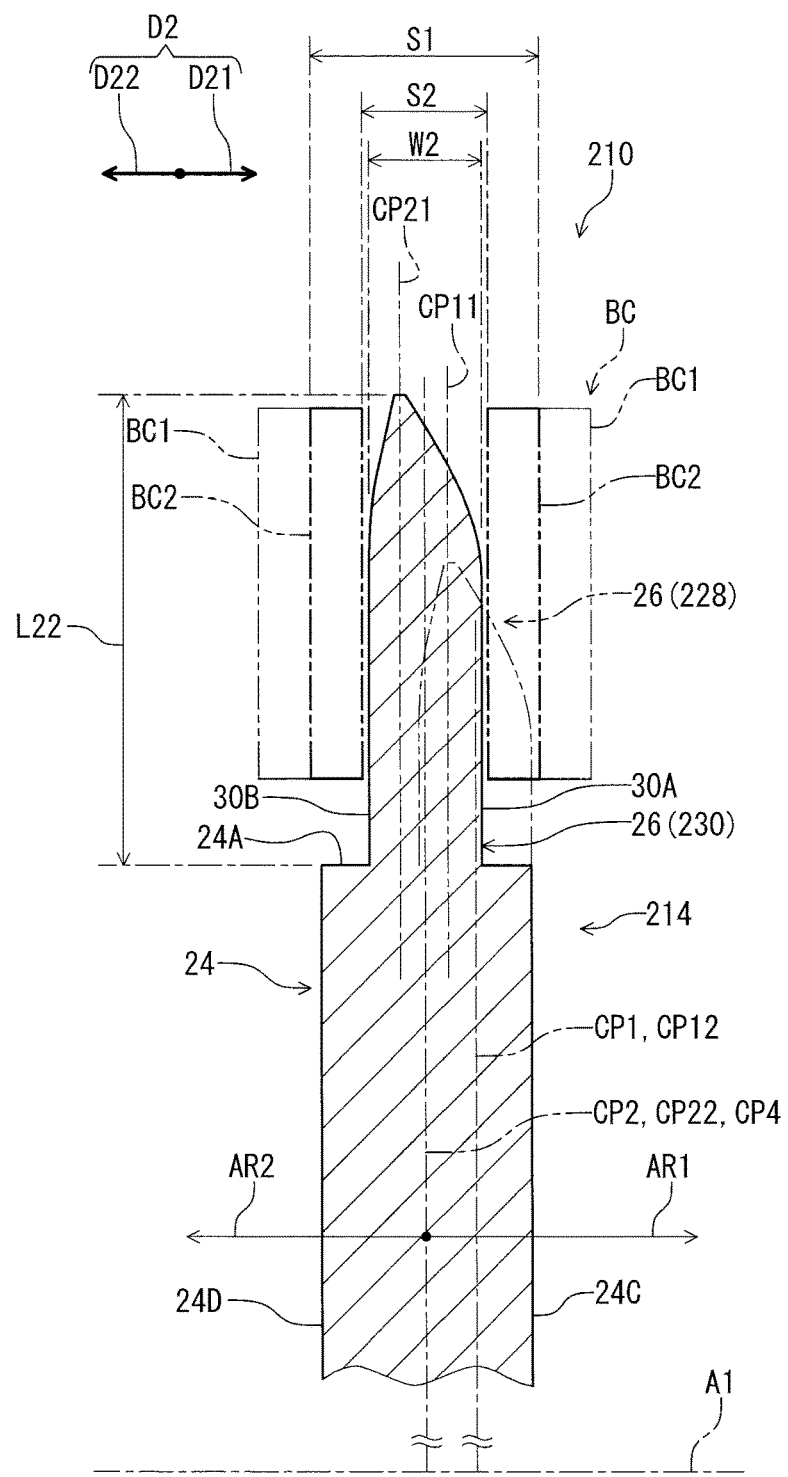
FIG. 13 is a cross-sectional view of the bicycle sprocket taken along line XIII-XIII of FIG. 14.

As seen in FIGS. 12 and 13, the first tooth 228 has a first radial length L21. The second tooth 230 has a second radial length L22. The chain-supporting portion 232 has a third radial length L23. The third radial length L23 of the chain-supporting portion 232 is larger than the first radial length L21 of the first tooth 228. The second radial length L22 of the second tooth 230 is larger than the first radial length L21 of the first tooth 228. The third radial length L23 of the chain-supporting portion 232 is equal to the second radial length L22 of the second tooth 230. However, dimensional relationship among the first radial length L21, the second radial length L22 and the third radial length L23 is not limited to the illustrated embodiment. For example, the second radial length L22 can be equal to or larger than at least one of the first radial length L21 and the third radial length L23.

Figure 14:
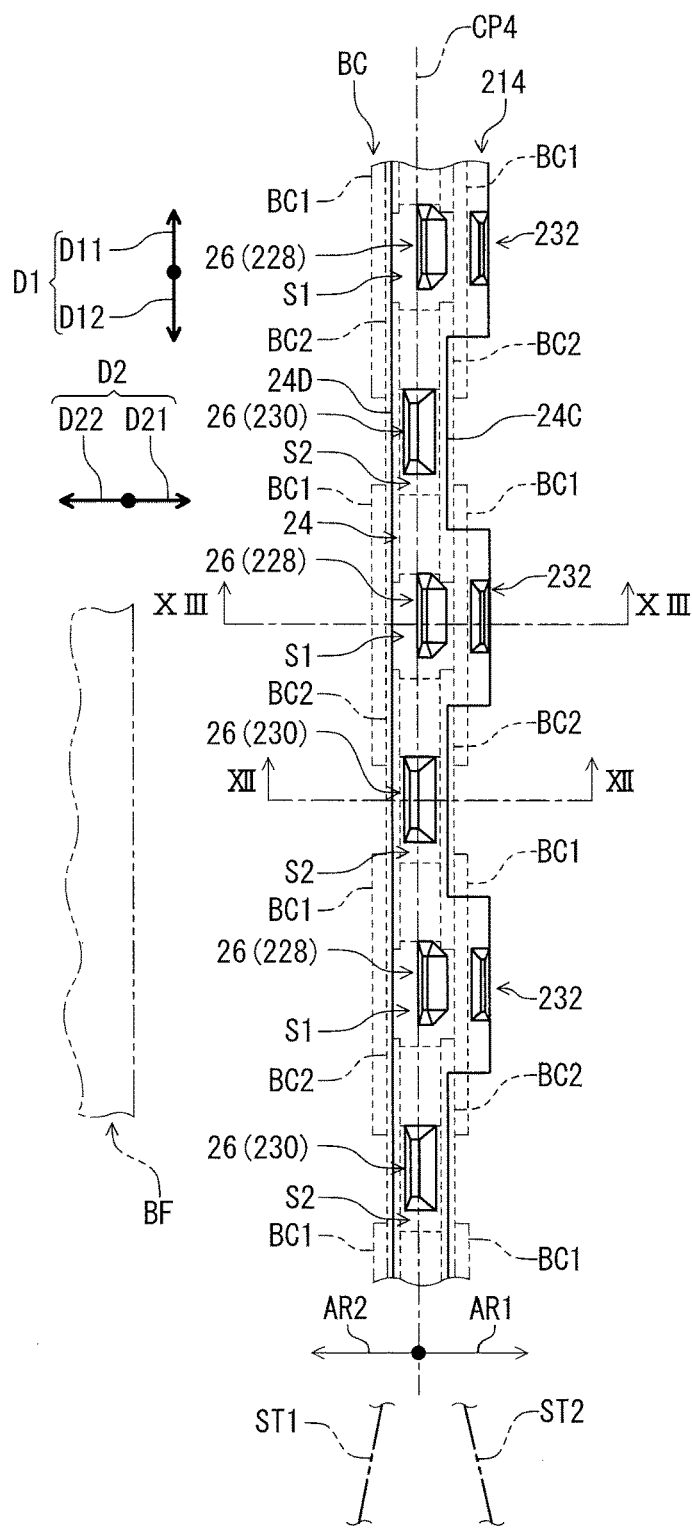
FIG. 14 is a development view of the bicycle sprocket illustrated in FIG. 10 when viewed from a radial direction of the bicycle sprocket, with the bicycle chain.
Figure 15:
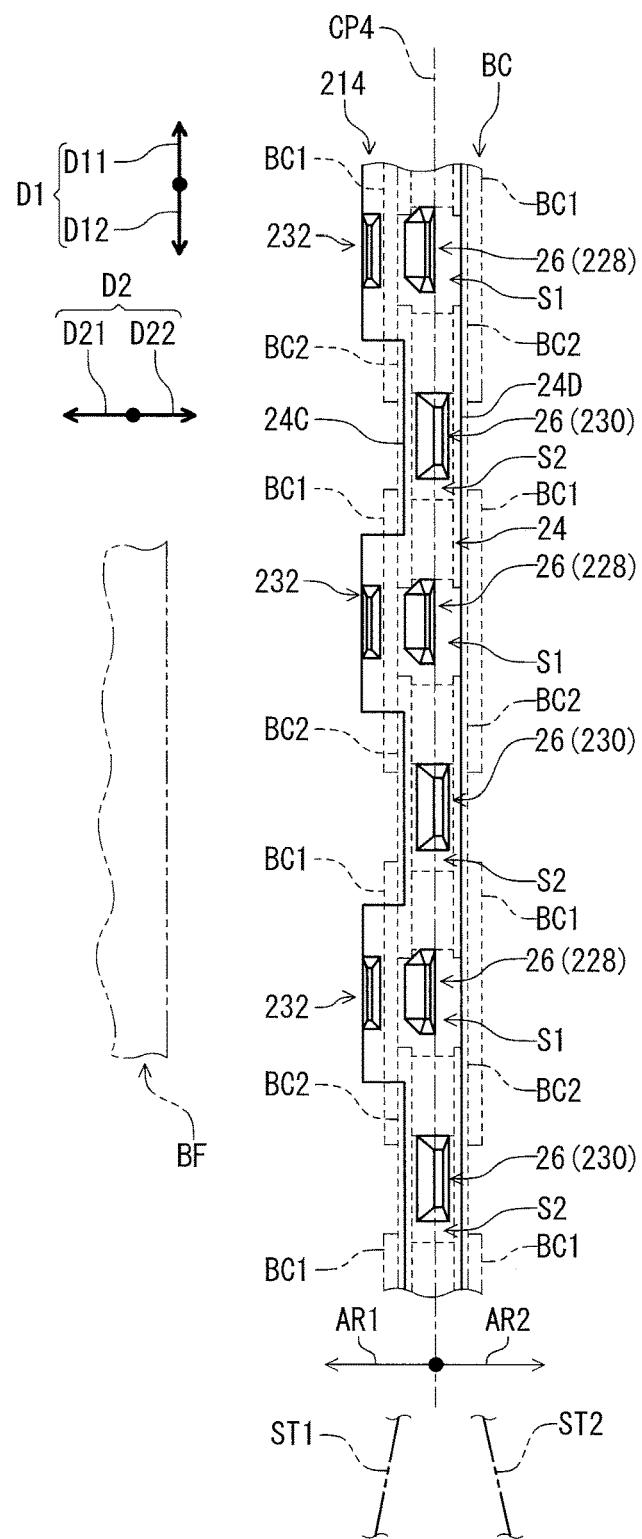
FIG. 15 is a development view of the bicycle sprocket illustrated in FIG. 10 when viewed from the radial direction of the bicycle sprocket, with the bicycle chain (modification).

In this embodiment, as seen in FIG. 14, the second axial surface 24D faces toward the bicycle frame BF in the axial direction D2 in a mounting state where the bicycle sprocket 214 is mounted to the bicycle frame BF. As seen in FIG. 15, however, the first axial surface 24C can face toward the bicycle frame BF in the axial direction D2 in the mounting state of the bicycle sprocket 214.

With the bicycle crank assembly 210 and the bicycle sprocket 214, it is possible to obtain substantially the same effects as those of the bicycle crank assembly 10 and the bicycle sprocket 14 of the first embodiment.

Modifications

In the first embodiment, as seen in FIGS. 6 and 7, the chain-supporting portions 32 are arranged on the sprocket body 24 to respectively face the plurality of second teeth 30 in the axial direction D2. However, the chain-supporting portions 32 can be offset from the second teeth 30 in the circumferential direction D1. In the second embodiment, as seen in FIGS. 14 and 15, the chain-supporting portions 232 are arranged on the sprocket body 24 to respectively face the plurality of first teeth 228 in the axial direction D2. However, the chain-supporting portions 232 can be offset from the first teeth 228 in the circumferential direction D1.

In the above embodiments, as seen in FIGS. 4, 5, 12, and 13, the first axial center plane CP1 and the second axial center plane CP2 are offset from each other in the axial direction D2. However, the first axial center plane CP1 can coincide with the second axial center plane CP2 in the axial direction D2.

In the first embodiment, the first teeth 28 and the second teeth 30 are alternatingly arranged on the outer periphery 24A of the sprocket body 24 in the circumferential direction D1 with respect to the rotational center axis A1. However, the bicycle sprocket 14 can comprise another tooth between the first tooth 28 and the second tooth 30 in the circumferential direction D1. Such another tooth can be offset from the first tooth 28 and the second tooth 30 in the axial direction D2.

Similarly, in the second embodiment, the first teeth 228 and the second teeth 230 are alternatingly arranged on the outer periphery 24A of the sprocket body 24 in the circumferential direction D1 with respect to the rotational center axis A1. However, the bicycle sprocket 214 can comprise another tooth between the first tooth 228 and the second tooth 230 in the circumferential direction D1. Such another tooth can be offset from the first tooth 228 and the second tooth 230 in the axial direction D2.

In the first embodiment, as seen in FIGS. 6 and 7, the chain-supporting portion 32 is arranged on the sprocket body 24 to support the bicycle chain BC so that the bicycle chain BC is partly positioned between the chain-supporting portion 32 and the second tooth 30 in the axial direction D2. However, the chain-supporting portion 32 can be arranged on the sprocket body 24 to support the bicycle chain BC so that the bicycle chain BC is partly positioned between the chain-supporting portion 32 and each of the first tooth 28 and the second tooth 30 in the axial direction D2.

In the second embodiment, as seen in FIGS. 14 and 15, the chain-supporting portion 232 is arranged on the sprocket body 24 to support the bicycle chain BC so that the bicycle chain BC is partly positioned between the chain-supporting portion 232 and the first tooth 228 in the axial direction D2. However, the chain-supporting portion 232 can be arranged on the sprocket body 24 to support the bicycle chain BC so that the bicycle chain BC is partly positioned between the chain-supporting portion 232 and each of the first tooth 228 and the second tooth 230 in the axial direction D2.

In the above embodiments, as seen in FIGS. 4 and 12, the first axial center plane CP1 is offset from the reference axial center plane CP4 toward the first axial surface 24C in the axial direction D2. However, the first axial center plane CP1 can coincide with the reference axial center plane CP4 in the axial direction D2.

In the above embodiments, as seen in FIGS. 4 and 12, the first axial surface 24C is disposed closer to the first teeth 28 than the second axial surface 24D in the axial direction D2. However, the second axial surface 24D can be disposed closer to the first teeth 28 than the first axial surface 24C in the axial direction D2.

In the above embodiments, as seen in FIGS. 4 and 12, the first tooth-tip center plane CP11 is offset from the first tooth-bottom center plane CP12 toward the second axial surface 24D in the axial direction D2. However, the first tooth-tip center plane CP11 can coincide with the first tooth-bottom center plane CP12.

In the above embodiments, as seen in FIGS. 5 and 13, the second tooth-tip center plane CP21 is offset from the second tooth-bottom center plane CP22 toward the second axial surface 24D in the axial direction D2. However, the second tooth-tip center plane CP21 can coincide with the second tooth-bottom center plane CP22.

In the above embodiments, as seen in FIGS. 5 and 12, the tip-center plane CP31 is offset from the bottom-center plane CP32 away from the reference axial center plane CP4 in the axial direction D2. However, the tip-center plane CP31 can coincide with the bottom-center plane CP32 in the axial direction D2.

In the first embodiment, as seen in FIGS. 4 and 5, the third radial length L3 of the chain-supporting portion 32 is larger than the second radial length L2 of the second tooth 30. The first radial length L1 of the first tooth 28 is larger than the second radial length L2 of the second tooth 30. The third radial length L3 of the chain-supporting portion 32 is equal to the first radial length L1 of the first tooth 28. However, the third radial length L3 of the chain-supporting portion 32 can be equal to or smaller than the second radial length L2 of the second tooth 30. The first radial length L1 of the first tooth 28 can be equal to or smaller than the second radial length L2 of the second tooth 30. The third radial length L3 of the chain-supporting portion 32 can be different from the first radial length L1 of the first tooth 28.

In the second embodiment, as seen in FIGS. 12 and 13, the third radial length L23 of the chain-supporting portion 232 is larger than the first radial length L21 of the first tooth 228. The second radial length L22 of the second tooth 230 is larger than the first radial length L21 of the first tooth 228. The third radial length L23 of the chain-supporting portion 232 is equal to the second radial length L22 of the second tooth 230. However, the third radial length L23 of the chain-supporting portion 232 can be equal to or smaller than the first radial length L21 of the first tooth 228. The second radial length L22 of the second tooth 230 can be equal to or smaller than the first radial length L21 of the first tooth 228. The third radial length L23 of the chain-supporting portion 232 can be different from the second radial length L22 of the second tooth 230.

In the above embodiments, as seen in FIGS. 4, 5, 12, and 13, the second maximum axial width W2 is equal to the first maximum axial width W1. However, the second maximum axial width W2 can be different from the first maximum axial width W1.

In the above embodiments, as seen in FIGS. 4 and 5, the third maximum axial width W3 is smaller than each of the first maximum axial width W1 and the second maximum axial width W2. However, the third maximum axial width W3 can be equal to or larger than at least one of the first maximum axial width W1 and the second maximum axial width W2.

In the first embodiment, as seen in FIG. 5, the second tooth 30 is disposed on the reference axial center plane CP4. However, the second tooth 30 can be offset from the reference axial center plane CP4 in the axial direction D2. In the second embodiment, as seen in FIG. 13, the second tooth 230 is disposed on the reference axial center plane CP4. However, the second tooth 230 can be offset from the reference axial center plane CP4 in the axial direction D2.

In the above embodiments, as seen in FIGS. 1, 2, 10, and 11, the bicycle sprockets 14 and 214 are front sprockets. However, the structure of each of the bicycle sprockets 14 and 214 can be applied to a rear sprocket. Furthermore, each of the bicycle sprocket 14 and 214 is a solitary sprocket attached to the bicycle crank arm 12. However, the bicycle crank assembly 10 can comprise another sprocket that has a different diameter from a diameter of the bicycle sprocket 14 in addition to the bicycle sprocket 14. The bicycle crank assembly 210 can comprise another sprocket that has a different diameter from a diameter of the bicycle sprocket 214 in addition to the bicycle sprocket 214.

In the first embodiment, as seen in FIGS. 1 and 2, the bicycle sprocket 14 comprises the plurality of chain-supporting portions 32. However, the bicycle sprocket 14 can comprise at least one chain-supporting portion 32. In the second embodiment, as seen in FIGS. 10 and 11, the bicycle sprocket 214 comprises the plurality of chain-supporting portions 232. However, the bicycle sprocket 214 can comprise at least one chain-supporting portion 232.

In the first embodiment, as seen in FIGS. 1 and 2, the plurality of sprocket teeth 26 includes the first teeth 28 and the second teeth 30. However, at least one of the first teeth 28 can be omitted from the bicycle sprocket 14 if needed and/or desired. At least one of the second teeth 30 can be omitted from the bicycle sprocket 14 if needed and/or desired. In the second embodiment, as seen in FIGS. 10 and 11, the plurality of sprocket teeth 26 includes the first teeth 228 and the second teeth 230. However, at least one of the first teeth 228 can be omitted from the bicycle sprocket 214 if needed and/or desired. At least one of the second teeth 230 can be omitted from the bicycle sprocket 214 if needed and/or desired.

It will be apparent to those skilled in the bicycle field from the present disclosure that the above embodiments and modifications can be at least partly combined with each other if needed and/or desired. For example, the bicycle sprocket can comprise the chain-supporting portion 32 of the first embodiment and the chain-supporting portion 232 of the second embodiment.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
   a sprocket body;
   a plurality of sprocket teeth circumferentially arranged on an outer periphery of the sprocket body, the plurality of sprocket teeth including
      at least one first tooth arranged on the outer periphery to be received within an outer link space defined between a pair of outer link plates of a bicycle chain, and
      at least one second tooth arranged on the outer periphery to be received within an inner link space defined between a pair of inner link plates of the bicycle chain; and
   at least one chain-supporting portion arranged on the sprocket body to face the bicycle chain in an axial direction parallel to a rotational center axis of the bicycle sprocket without being received within the outer link space and the inner link space in a state where the plurality of sprocket teeth engages with the bicycle chain, the at least one chain-supporting portion being spaced apart from the at least one of at least one first tooth and the at least one second tooth in the axial direction, wherein
   the at least one chain-supporting portion faces the at least one second tooth in the axial direction.

2. The bicycle sprocket according to claim 1, wherein
   the at least one chain-supporting portion is arranged on the sprocket body to face the at least one of the at least one first tooth and the at least one second tooth in the axial direction.

3. The bicycle sprocket according to claim 1, wherein
   the at least one first tooth includes a first axial center plane defined at a center of the at least one first tooth in the axial direction,
   the at least one second tooth includes a second axial center plane defined at a center of the at least one second tooth in the axial direction, and
   the first axial center plane and the second axial center plane are offset from each other in the axial direction.

4. The bicycle sprocket according to claim 3, wherein
   the at least one first tooth and the at least one second tooth are alternatingly arranged on the outer periphery of the sprocket body in a circumferential direction with respect to the rotational center axis.

5. The bicycle sprocket according to claim 3, wherein
   the sprocket body includes
      a first axial surface,
      a second axial surface opposite to the first axial surface in the axial direction, and
      a reference axial center plane defined at a center between the first axial surface and the second axial surface in the axial direction, and
   the first axial center plane is offset from the reference axial center plane toward the first axial surface in the axial direction.

6. The bicycle sprocket according to claim 5, wherein
   the reference axial center plane defines a first axial area and a second axial area opposite to the first axial area relative to the reference axial center plane in the axial direction,
   the first axial surface and the first axial center plane are arranged in the first axial area,
   the second axial surface is arranged in the second axial area, and
   the at least one chain-supporting portion is arranged in the first axial area.

7. The bicycle sprocket according to claim 6, wherein
   the at least one first tooth has a first tooth-tip center plane and a first tooth-bottom center plane, and
   the first tooth-tip center plane is offset from the first tooth-bottom center plane toward the second axial surface in the axial direction.

8. The bicycle sprocket according to claim 6, wherein
   the at least one second tooth has a second tooth-tip center plane and a second tooth-bottom center plane, and
   the second tooth-tip center plane is offset from the second tooth-bottom center plane toward the second axial surface in the axial direction.

9. The bicycle sprocket according to claim 6, wherein
   the at least one first tooth has a first tooth-tip center plane and a first tooth-bottom center plane,
   the first tooth-tip center plane is offset from first tooth-bottom center plane toward the second axial surface in the axial direction,
   the at least one second tooth has a second tooth-tip center plane and a second tooth-bottom center plane, and
   the second tooth-tip center plane is offset from the second tooth-bottom center plane toward the second axial surface in the axial direction.

10. The bicycle sprocket according to claim 5, wherein
    the first axial surface is disposed closer to the at least one first tooth than the second axial surface in the axial direction.

11. The bicycle sprocket according to claim 5, wherein
    the reference axial center plane defines a first axial area and a second axial area opposite to the first axial area relative to the reference axial center plane in the axial direction,
    the first axial surface and the first axial center plane are arranged in the first axial area, the second axial surface is arranged in the second axial area, and the at least one chain-supporting portion is arranged in the first axial area and faces the at least one first tooth in the axial direction.

12. The bicycle sprocket according to claim 11, wherein the at least one first tooth has a first tooth-tip center plane and a first tooth-bottom center plane, and the first tooth-tip center plane is offset from the first tooth-bottom center plane toward the second axial surface in the axial direction.

13. The bicycle sprocket according to claim 11, wherein the at least one second tooth has a second tooth-tip center plane and a second tooth-bottom center plane, and the second tooth-tip center plane is offset from the second tooth-bottom center plane toward the second axial surface in the axial direction.

14. The bicycle sprocket according to claim 11, wherein the at least one first tooth has a first tooth-tip center plane and a first tooth-bottom center plane, the first tooth-tip center plane is offset from first tooth-bottom center plane toward the second axial surface in the axial direction, the at least one second tooth has a second tooth-tip center plane a second tooth-bottom center plane, and the second tooth-tip center plane is offset from the second tooth-bottom center plane toward the second axial surface in the axial direction.

15. The bicycle sprocket according to claim 5, wherein the at least one chain-supporting portion has a tip-center plane and a bottom-center plane, and the tip-center plane is offset from the bottom-center plane away from the reference axial center plane in the axial direction.

16. The bicycle sprocket according to claim 1, wherein the at least one chain-supporting portion is arranged on the sprocket body to support the bicycle chain so that the bicycle chain is partly positioned between the at least one chain-supporting portion and the at least one of the at least one first tooth and the at least one second tooth in the axial direction.

17. A bicycle crank assembly comprising:
a bicycle crank arm; and
the bicycle sprocket according to claim 1, the bicycle sprocket being a solitary sprocket attached to the bicycle crank arm.

18. The bicycle sprocket according to claim 1, wherein the at least one chain-supporting portion includes a plurality of chain-supporting portions.

19. A bicycle sprocket comprising:
a sprocket body;
a plurality of sprocket teeth circumferentially arranged on an outer periphery of the sprocket body, the plurality of sprocket teeth including
at least one first tooth arranged on the outer periphery to be received within an outer link space defined between a pair of outer link plates of a bicycle chain, and
at least one second tooth arranged on the outer periphery to be received within an inner link space defined between a pair of inner link plates of the bicycle chain; and
at least one chain-supporting portion arranged on the sprocket body to face the bicycle chain in an axial direction parallel to a rotational center axis of the bicycle sprocket without being received within the outer link space and the inner link space in a state where the plurality of sprocket teeth engages with the bicycle chain, the at least one chain-supporting portion being spaced apart from the at least one of at least one first tooth and the at least one second tooth in the axial direction, wherein
a radial length of the at least one chain-supporting portion is larger than a radial length of the at least one of the at least one first tooth and the at least one second tooth.

20. A bicycle sprocket comprising:
a sprocket body;
a plurality of sprocket teeth circumferentially arranged on an outer periphery of the sprocket body, the plurality of sprocket teeth including
at least one first tooth arranged on the outer periphery to be received within an outer link space defined between a pair of outer link plates of a bicycle chain, and
at least one second tooth arranged on the outer periphery to be received within an inner link space defined between a pair of inner link plates of the bicycle chain; and
at least one chain-supporting portion arranged on the sprocket body to face the bicycle chain in an axial direction parallel to a rotational center axis of the bicycle sprocket without being received within the outer link space and the inner link space in a state where the plurality of sprocket teeth engages with the bicycle chain, the at least one chain-supporting portion being spaced apart from the at least one of at least one first tooth and the at least one second tooth in the axial direction, wherein
the at least one first tooth has a first maximum axial width defined in the axial direction, and
the at least one second tooth has a second maximum axial width defined in the axial direction, the second maximum axial width being equal to the first maximum axial width.

21. The bicycle sprocket according to claim 20, wherein the at least one chain-supporting portion has a third maximum axial width defined in the axial direction, the third maximum axial width being equal to or smaller than each of the first maximum axial width and the second maximum axial width.

22. A bicycle sprocket comprising:
a sprocket body;
a plurality of sprocket teeth circumferentially arranged on an outer periphery of the sprocket body, the plurality of sprocket teeth including
at least one first tooth arranged on the outer periphery to be received within an outer link space defined between a pair of outer link plates of a bicycle chain, and
at least one second tooth arranged on the outer periphery to be received within an inner link space defined between a pair of inner link plates of the bicycle chain; and
at least one chain-supporting portion arranged on the sprocket body to face the bicycle chain in an axial direction parallel to a rotational center axis of the bicycle sprocket without being received within the outer link space and the inner link space in a state where the plurality of sprocket teeth engages with the bicycle chain, the at least one chain-supporting portion being spaced apart from the at least one of at least one first tooth and the at least one second tooth in the axial direction, wherein
the sprocket body includes a first axial surface, a second axial surface opposite to the first axial surface in the axial direction, and a reference axial center plane defined at a center between the first axial surface and the second axial surface in the axial direction, and the at least one second tooth is disposed on the reference axial center plane.

23. A bicycle sprocket comprising:

a sprocket body;

a plurality of sprocket teeth circumferentially arranged on an outer periphery of the sprocket body, at least one of the plurality of sprocket teeth having a tooth-tip center plane and a tooth-bottom center plane, the tooth-tip center plane being offset from the tooth-bottom center plane in an axial direction parallel to a rotational center axis of the bicycle sprocket, the at least one of the plurality of sprocket teeth being arranged on the outer periphery to be received within a link-plate space defined between a pair of link plates of a bicycle chain; and at least one chain-supporting portion spaced apart from the plurality of sprocket teeth in the axial direction without being received within the link-plate space of the bicycle chain in a state where the plurality of the sprocket teeth engages with the bicycle chain.

24. The bicycle sprocket according to claim 23, wherein each of the plurality of sprocket teeth has the tooth-tip center plane and the tooth-bottom center plane, and each of the plurality of sprocket teeth is arranged on the outer periphery to be received within the link-plate space.

25. The bicycle sprocket according to claim 23, wherein the at least one chain-supporting portion includes a plurality of chain-supporting portions.

26. A bicycle sprocket comprising:

a sprocket body;

a plurality of sprocket teeth circumferentially arranged on an outer periphery of the sprocket body, at least one of the plurality of sprocket teeth being arranged on the outer periphery to be received within a link-plate space defined between a pair of link plates of a bicycle chain; and at least one chain-supporting portion spaced apart from the plurality of sprocket teeth in the axial direction without being received within the link-plate space of the bicycle chain, a radial length of the at least one chain-supporting portion being larger than a radial length of at least one of the plurality of sprocket teeth.

* * * * *